United States Patent [19]

Despois et al.

[11] 4,190,099

[45] Feb. 26, 1980

[54] HEAT TRANSFER SYSTEM FOR THE UTILIZATION OF CAVITIES DUG IN THE SUBSOIL AS HEAT SILOS

[75] Inventors: Jacques Despois, Viroflay; Francis Nougarede, La Celle Saint Cloud, both of France

[73] Assignees: Commissariat a l'Energie Atomique, Paris; Societe Nationale elf Aquitaine, Courbevoie, both of France

[21] Appl. No.: 877,587

[22] Filed: Feb. 13, 1978

[30] Foreign Application Priority Data

Feb. 18, 1977 [FR] France ............................. 77 04657

[51] Int. Cl.² ............................................. F28D 15/00
[52] U.S. Cl. ............................. 165/45; 165/104 S; 165/107 D; 165/DIG. 4
[58] Field of Search ........... 165/40, 45, 104 S, 107 D, 165/DIG. 4, 32; 126/400

[56] References Cited

U.S. PATENT DOCUMENTS

| | | | |
|---|---|---|---|
| 1,959,286 | 5/1934 | Grebe | 165/DIG. 4 |
| 2,933,885 | 4/1960 | Benedek et al. | 165/104 S |
| 3,608,624 | 9/1971 | Hasselriis | 165/107 D |
| 3,857,244 | 12/1974 | Faucette | 165/45 |
| 3,974,642 | 8/1976 | Pacault | 165/104 S |
| 4,124,061 | 11/1978 | Mitchell et al. | 165/104 S |

FOREIGN PATENT DOCUMENTS 2272019 12/1975 France ........................................ 165/45

*Primary Examiner*—Sheldon Jay Richter
*Attorney, Agent, or Firm*—Sughrue, Rothwell, Mion, Zinn and Macpeak

[57] ABSTRACT

One or a number of subsoil cavities are employed for the storage or recovery of hot liquids. At the time of heat storage, a heat-transporting liquid is extracted at low temperature at the lower end of each cavity, heated by heat exchange with an external fluid and reinjected at the upper end. At the time of heat recovery, the heat-transporting liquid is extracted at high temperature at the upper end of each cavity, cooled by heat exchange with an external fluid and reinjected at the lower end. The system comprises flow-arresting means for maintaining a minimum operating pressure at the top of each cavity, air or gas purge means, an expansion reservoir and a safety unit for ensuring one-way flow of the heat-transporting liquid from the expansion reservoir to each cavity.

35 Claims, 21 Drawing Figures

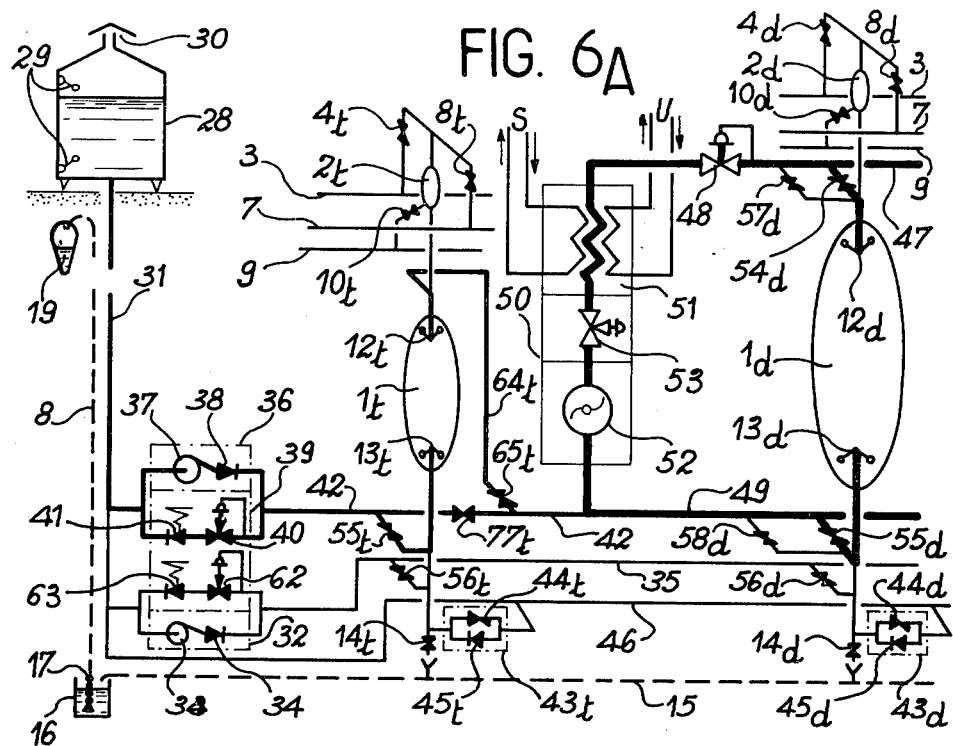

HEAT TRANSFER SYSTEM FOR THE UTILIZATION OF CAVITIES DUG IN THE SUBSOIL AS HEAT SILOS

This invention relates to a heat-transfer system for the utilization of cavities dug in the subsoil as heat silos. In more precise terms, the heat-transfer system in accordance with the invention essentially comprises a set of means so arranged that their combined operation makes it possible to effect the circulation of a heat-transporting liquid. This permits on the one hand the introduction of heat into one or a number of cavities which are dug in the subsoil and the available internal capacity of which is normally filled with said heat-transporting liquid during the stages of utilization and, on the other hand, the removal of heat from said cavity or cavities. Said means consist especially of pumps, control valves, check valves and heat exchangers and also serve to carry out suitable transfers of said heat-transporting liquid in order to ensure that a suitable internal pressure is maintained or restored. This makes it possible to utilize the cavity or cavities as heat storage silos whenever necessary and at the same time to ensure guaranteed safety of installations and of the environment under all circumstances.

The possibility of employing cavities dug in the subsoil as large pressure reservoirs for the storage of hot water at temperatures above 100° C. has been contemplated in particular during the eighth World Energy Conference (Bucharest, 28th June, 1971).

The particular problems created by the expansions and contractions of the heat-transporting liquid have been discussed but no concrete solution to these problems has been found. In the techniques which have been developed for the storage of hot liquids in subsoils (the most common liquid is water and consideration will accordingly be made to this case in order to illustrate the problems which arise), one of the essential difficulties lies in the need to store this water in liquid form, namely at a high pressure which is at least equal in value to the saturated vapor pressure at the maximum storage temperature.

In fact, partial vaporization of the heat-transporting fluid within the storage circuit (cavity—piping system—heat exchangers—pumps) as a result of a pressure drop would give rise to partial vaporization of the fluid. This would first of all have the effect of causing a vapor lock and stoppage of the circulation followed by turbulent two-phase circulation at a temperature below that of the single-phase fluid, thus entailing the risk of damage to the most delicate parts of the circuit.

Finally, by causing vaporization, the pressure drop within the cavities would produce a storage temperature corresponding to withdrawal of the latent heat of vaporization. This abrupt formation of steam would then result in expansion of a volume of liquid corresponding to the volume of formed vapor. If this expelled liquid mass is hot and reaches the surface connection pipe, the formation of steam bubbles will necessarily result in a changeover to the two-phase flow regime, this being accompanied by pulsatory phenomena and establishment of a blow-out condition resulting in expulsion of the entire quantity of stored fluid to the surface.

Moreover, the storage cavities necessarily have a hot-liquid portion (at the upper end) and a cold-liquid portion (at the lower end) with a movable interface and variable relative volumes, depending on whether heat is supplied to or extracted from the storage system. This primarily results in very substantial variations in volume caused by expansion of the hot liquid within the cavities which are intended by design to be practically at constant volume.

A practical example will serve to gain a better understanding of this problem. In the frequent case of storage of heat in water in the liquid state, if a maximum temperature of 300° C. is contemplated within the installation, this latter must be pressurized to a value of 86 bar corresponding to the vapor pressure of the water at 300° C. Under these conditions of pressure and temperature, the density of the water is $d=0.712$ and 1 (metric) ton of water has a volume of 1.40 m$^3$; postulating that the temperature of the cold water is 20° C., the density of said cold water at the same pressure of 86 bar is $d=1.002$ and 1 ton of said water then has a volume of only 0.99 m$^3$. It is apparent that, between these two states, a given mass of water undergoes a variation in volume of 40% which the storage system must be capable of absorbing.

Certain studies have made reference to the possibility of preventing vaporization of the heat-transporting fluid by maintaining an inert pressurized atmosphere in the upper portion of the storage reservoirs. However, a double economic penalty is attached to this solution. In point of fact, the variations in volume of the heat-transporting liquid are always considerable and result in prohibitive power consumption costs for compression of the gas during the heat recovery stages whilst the need to maintain a minimum atmosphere at the moment of maximum expansion entails an appreciable increase in volume of the cavities, the unitary cost of which is of a high order and the maximum dimensions of which are strictly imposed by the mechanical characteristics of the terrain. In addition to these economic restrictions, technical difficulties arise from the variations in temperature of this atmosphere. These in turn create difficult problems of pressure regulation which are left unmentioned in theoretical studies and are in fact virtually unsolved. Other studies have envisaged the possibility of pressurization by injection and withdrawal of liquid but no detailed description of this type of process has been given. It would appear reasonable to assume that pressurization and expansion can be obtained by means of simple pressurizers of the conventional type commonly employed for very small volumes in the production of sanitary or domestic hot water or for larger but still insignificant volumes compared with those employed in heat storage systems, in the case of nuclear power stations of the pressurized-water reactor type. Such pressurizers are clearly not suited to the particular problem of heat storages in which pressurization or expansion is expected to require very high rates of flow of the order of several hundred cubic meters per hour or even more, depending on the size of storage facilities, the temperatures contemplated and the nature of the heat-transporting liquid.

Finally, certain researches have purely and simply neglected the problem of pressures, despite the fact that this governs the possibility of utilizing a cavity dug in the subsoil as a heat silo while ensuring safety of the installations and of the environment. The reports on the proceedings of the World Energy Conference as well as patent No. 74/18318 filed by Electricite de France on May 21, 1973 in respect of "Method of thermal energy storage", both describe a method of storage of heat energy within cavities dug in the subsoil, this method being based solely on the recovery of sensible heat of a heat-transporting fluid stored within underground cavities. An installation of this type cannot be put into service without immediate danger of explosion if there does not exist any means for pressurization, pressure relief and expansion. The simple addition of these means is not sufficient to solve all the problems created by exploitation and safety of cavities which are dug in the subsoil and employed as heat silos. In fact, the relative values of the flow rates involved raises the problem of even accidental and momentary maladjustment. In particular, this would be liable to cause partial vaporization of the stored hot liquid, to stop the operation of the heat exchangers and even to result in damage or destruction of these latter.

Moreover, the problems arising from inevitable cooling of the fluid, especially as a result of either accidental or programmed shutdown of the installation, are not taken into consideration in any of the methods and systems of the prior art. If the cavity or cavities remain leak-tight, the contraction of the liquid and its resultant vaporization eventually have the effect of establishing an internal pressure which is lower than the adjacent hydrostatic pressure and then lower than the atmospheric pressure. This in turn gives rise to major disturbances, including such hazards as ingress of natural water into installations, corrosion and impairment of leak-tightness of these installations. The maximum predictable hazard in such a case would be the total destruction of the system by implosion. Simple venting of the cavities to the external atmosphere (which has in any case not been contemplated in the state of the prior art) would guard against such extreme consequences only at the cost of considerable subsequent operational difficulties resulting from corrosion and the need to ensure effective purging of the installation before this latter is put back in service. This solution is in any case not applicable to all heat-transporting fluids since some of them are highly oxidizable in the hot state.

It is apparent from a study of the prior art that, in order to employ cavities dug in the ground as heat silos, it would not be possible to resort to the mere juxtaposition of conventional means without thereby incurring serious risks. On the other hand, conventional means such as pumps, control valves, check valves, heat exchangers, which are suitably arranged for combined operation in such a manner as to achieve the desired objective make it possible to solve all the problems which had hitherto been inadequately solved or even unsuspected. The heat transfer system in accordance with the invention is precisely intended to constitute a coherent combination of conventional means with a view to making up for the deficiencies of the prior art.

The heat transfer system in accordance with the invention is intended to permit the use of one or a number of cavities dug in the subsoil as heat silos. Said cavities are suitably lined and heat-insulated, have dimensions adapted to the mechanical characteristics of the terrain and to storage requirements, have an available internal capacity which is normally filled with a heat-transporting fluid during the stages of utilization. The device essentially comprises:

(1) equipment units for said cavity or cavities comprising in the case of each cavity:

at the top portion thereof a purge device comprising a small auxiliary chamber which permits the expulsion of the internal atmosphere at the time of initial filling with heat-transporting liquid, the maintenance of a small predetermined quantity of air or inert gas within said auxiliary chamber and the subsequent expulsion of any excess gas produced by degassing of the heat-transporting liquid;

inside the cavity, two units for injection and recovery of the heat-transporting liquid, one unit being located at the top of the cavity and the other unit being located at the bottom of said cavity.

(2) expansion means comprising at least one expansion vessel at atmospheric pressure which is put into communication with the base of the cavity or each cavity by means of a system of pipe lines for transferring the heat-transporting liquid especially by making use of pressurization and pressure relief means.

(3) pressurization and relief means put into communication by means of pipe lines on the one hand with the vessel or vessels for expansion to atmospheric pressure and on the other hand with the base of the cavity or each cavity. Preferably, said pressurization means comprise at least the following elements mounted in parallel:

at least one initial-pressurization pump fitted with a non-return valve and capable of producing at the top of the cavity or cavities and prior to any heat storage or recovery a reference pressure of substantially higher value than the vapor pressure of the heat-transporting liquid at the maximum storage temperature by injecting heat-transporting liquid derived from the expansion means;

a pressurization-pumping unit constituted by one or a number of pumps fitted with non-return valves so that a flow of heat-transporting liquid from the expansion means to the cavity or cavities is ensured by said unit under all conditions of utilization, the rate of flow of liquid being equal to or slightly higher than that which is strictly necessary to maintain the pressure at the top of the cavity or cavities in use at a value equal to the reference pressure aforesaid, even despite the contraction of the heat transporting liquid caused by cooling of said liquid during the heat-extraction stages;

a pressure relief unit comprising at least one pressure-regulating valve or at least one calibrated check-valve for ensuring a sufficiently high flow rate of heat-transporting liquid from the cavity or cavities to the expansion means under all circumstances while maintaining a pressure equal to the reference pressure aforesaid at the top of the cavity or cavities;

a safety unit comprising on the one hand at least one outlet valve, one calibrated check valve or like means for putting the cavity or each cavity into communication with the expansion means if the pressure at the top of the cavity under consideration exceeds a predetermined value or so-called safety pressure which is substantially higher than said reference pressure but compatible with the characteristics of said cavity under consideration, and comprising on the other hand at least one check valve or so-called filling valve or like means mounted in parallel with the outlet valve or the calibrated check valve aforesaid and intended to permit the heat-transporting liquid to pass freely from the expansion means to said cavity under consideration while entirely preventing any flow in the opposite direction.

(4) a circulation and heat transfer circuit for connecting said injection-recovery equipment unit or units located at the top of the cavity, of one cavity or of a group of cavities to said injection-recovery equipment unit or units located at the base of the same cavity or the same group of cavities or alternatively through the action of suitable valves to the base of another cavity or another group of cavities connected in series with the first cavity or the first group of cavities, said circulation and heat transfer circuit being such as to comprise:

one or a number of flow-arresting valves mounted in the pipe line or lines, directly connected to said injection-recovery equipment unit or units located at the top of the cavity or cavities and constituted by one or a number of normally-closed valves in which the opening is controlled by the pressure within the cavity or cavities or by any other equivalent device for isolating the top of the cavity from the remainder of the system if the internal pressure at the top of the cavity or cavities falls to a value below a minimum operating pressure which is in turn slightly higher than the vapor pressure of the heat-transporting liquid at the maximum storage temperature and appreciably lower than the reference pressure aforesaid;

heat exchange means comprising one or a number of heat exchangers which can be liquid-liquid exchangers, gas-liquid or liquid-gas exchangers, condensers or boilers for effecting heat transfer from an external system to the heat-transporting liquid at the time of heat storage and from the heat-transporting liquid to the same or another external system at the time of heat recovery;

at least one pumping unit for circulating the heat-transporting liquid in one direction at the time of heat storage and in the other direction at the time of heat recovery at a flow rate of slightly higher value than the rate required by the conditions prevailing within the external heat supply and heat recovery systems;

regulating devices such as flow-regulating valves mounted in series or in parallel with the pumping unit aforesaid and serving to adjust the rate of flow of heat-transporting liquid in both directions as a function of the conditions imposed by the external heat supply and heat recovery systems.

The heat-transfer system in accordance with the invention thus permits:

initial filling by virtue of the purge devices;
initial pressurization of the cavity or cavities at lower cost and with excellent adjustment to the reference pressure by virtue of the small volume of gas remaining within the auxiliary chamber or chambers;
storage of heat at the desired flow rate immediately upon completion of initial pressurization.

On the other hand, the flow-arresting valve prevents vaporization of the heat-transporting liquid which could result from commencement of heat storage at an insufficient initial pressure and would be liable to disturb the operation of the heat-transfer means and even cause damage to these latter. During the heat storage operation, the pressure relief unit allows the cold or lukewarm heat-transporting liquid to escape towards the expansion vessel or vessels. Any defect or fault condition in the pressure relief unit is liable to give rise either to an overpressure or to insufficient pressure within the cavity or cavities. In the first case, the calibrated check-valve or outlet valve or valves of the safety unit serve to protect the cavity or cavities concerned; in the second case which is particularly critical for the heat exchangers, these latter are isolated from the top portion of the cavity or cavities and the heat storage process is immediately interrupted by the flow-arresting valve or valves. When the heat transfer system in accordance with the invention has permitted storage of a predetermined quantity of heat and is then located in the stand-by position, the initial-pressurization pump which is maintained in service permits maintenance of the flow-arresting valve in the open position. Heat storage can then be resumed or heat recovery can be begun without delay and at very low power-consumption cost, the design function of the pressure relief unit being in any case intended to prevent overstepping of the reference pressure. However, in the event of utilization on a programmed time-schedule basis, the above-mentioned power-consumption cost can be reduced even further by stopping the initial-pressurization pump or pumps during the stand-by period. Cooling due to heat losses results in contraction of the heat-transporting liquid. The flow-arresting valve closes, whereupon the contraction continues and incipient boiling may occur in the upper portion of the installation. The system in accordance with the invention takes advantage of the fact that, in spite of the relatively high values of the heat of vaporization with respect to the values of sensible heat, the vaporization of the heat-transporting liquid within an enclosed system affects only a relatively very limited mass and does not greatly modify the heat balance. Resumption of heat storage or commencement of heat recovery can in any case be contemplated only after a pressure rise produced by the initial-pressurization pump or pumps or if necessary by the pressurization pumping unit since the flow-arresting valve would otherwise remain closed. The result thereby achieved is that the formed vapor condenses, the heat of vaporization is recovered and cavity utilization can be resumed without difficulty while limiting power consumption to a minimum cost. The heat transfer system in accordance with the invention further permits:

the recovery of stored heat with minimum power consumption as a result of adaptation of the pressurization pumping unit to the circulation pumping unit, thereby permitting good adjustment to strictly essential and minimum rates of pressurization transfer, which is a particularly costly process.

It is worthy of note at this juncture that the pressurization rate can easily be regulated as a function of the residual rate of flow permitted by the pressure relief unit during the heat recovery stages. After a long period of accidental or programmed shutdown of the system in accordance with the invention, cooling of the heat-transporting liquid cannot cause any disturbance even if all the pressurization means were to prove unserviceable at the end of such a period. In fact, well before the pressure within the cavity or cavities reaches sufficiently low values to incur a risk of implosion or destruction of leak-tightness, the outlet valve or valves of the safety unit open alone, with the result that the heat-transporting liquid remaining within the expansion vessel or vessels is permitted to maintain a minimum pressure equal to the pressure of the liquid column.

It should also be observed that the heat transfer system in accordance with the invention does not lay down any prerequisite condition in regard to the manner in which heat is stored within the cavity or cavities. It will clearly be possible to employ the sensible heat of the heat-transporting liquid itself since the hot liquid within the cavity or cavities is always present above the cold heat-transporting liquid (or which has a lower temperature and therefore a higher density). But especially under high temperature conditions in which the volume heat capacity of heat-transporting liquids is considerably impaired, it can be found advantageous to employ the system in accordance with the invention with one or a number of cavities which have previously been almost completely filled with permeable and porous material which has a good volume heat capacity, is inexpensive, has relatively low heat conductivity and a suitable particle size such as gravel or granular material. The heat-transporting liquid then has only a partial contributory function in the heat storage process but continues to carry out its transfer function in the same manner. The system in accordance with the invention can also be employed as a means for storing and recovering the heat of change of state, in which case the porous and permeable medium is constituted by small enclosed vessels containing, for example, a predetermined quantity of solid substance which melts at a suitable temperature. Said cavities which are dug in the ground can advantageously be constructed in accordance with French patent Application No. 76/36.283 of Dec. 2, 1976. This makes it possible to limit the depth in respect of a given operating pressure and if necessary to reduce the mechanical stresses arising from expansions of the surrounding terrain.

As an advantageous feature, said heat-transporting liquid can be water to which corrosion inhibitors can be added if necessary.

Finally, the safety device makes it possible to maintain the pressure within the storage circuit at a value which is lower than the safety pressure (in order to prevent explosion of the cavities) and higher than the hydrostatic pressure (in order to prevent implosion of said cavities). The first of the two functions mentioned above is ensured by means of a calibrated check-valve although the presence of this latter is not strictly indispensable by reason of the fact that an explosion hazard can be more readily controlled since it is dependent only on the maximum temperature attained by the system. The second function aforesaid makes it necessary on the contrary to provide a filling valve which operates in one direction (from the expansion means to the cavity or cavities) since the potential danger of implosion of the cavities would otherwise be inevitable in the event of cooling of the installation.

Further distinctive features and advantages of the present invention will become more readily apparent from the following description of exemplified embodiments of the heat transfer system in accordance with the invention, said embodiments being given by way of illustration but not in any limiting sense. Reference will be made hereinafter to the accompanying drawings in which:

FIG. 5 illustrates the detail of an injection-recovery unit.

FIG. 6 illustrates two modes of assembly of a buffer cavity designed to produce a double expansion: thus FIG. 6a shows a high-pressure assembly and FIG. 6b shows a low-pressure assembly;

FIG. 7 illustrates an assembly comprising in addition a buffer cavity, auxiliary means for cooling the heat-transporting liquid employed in the double expansion process: thus

Figure 10:
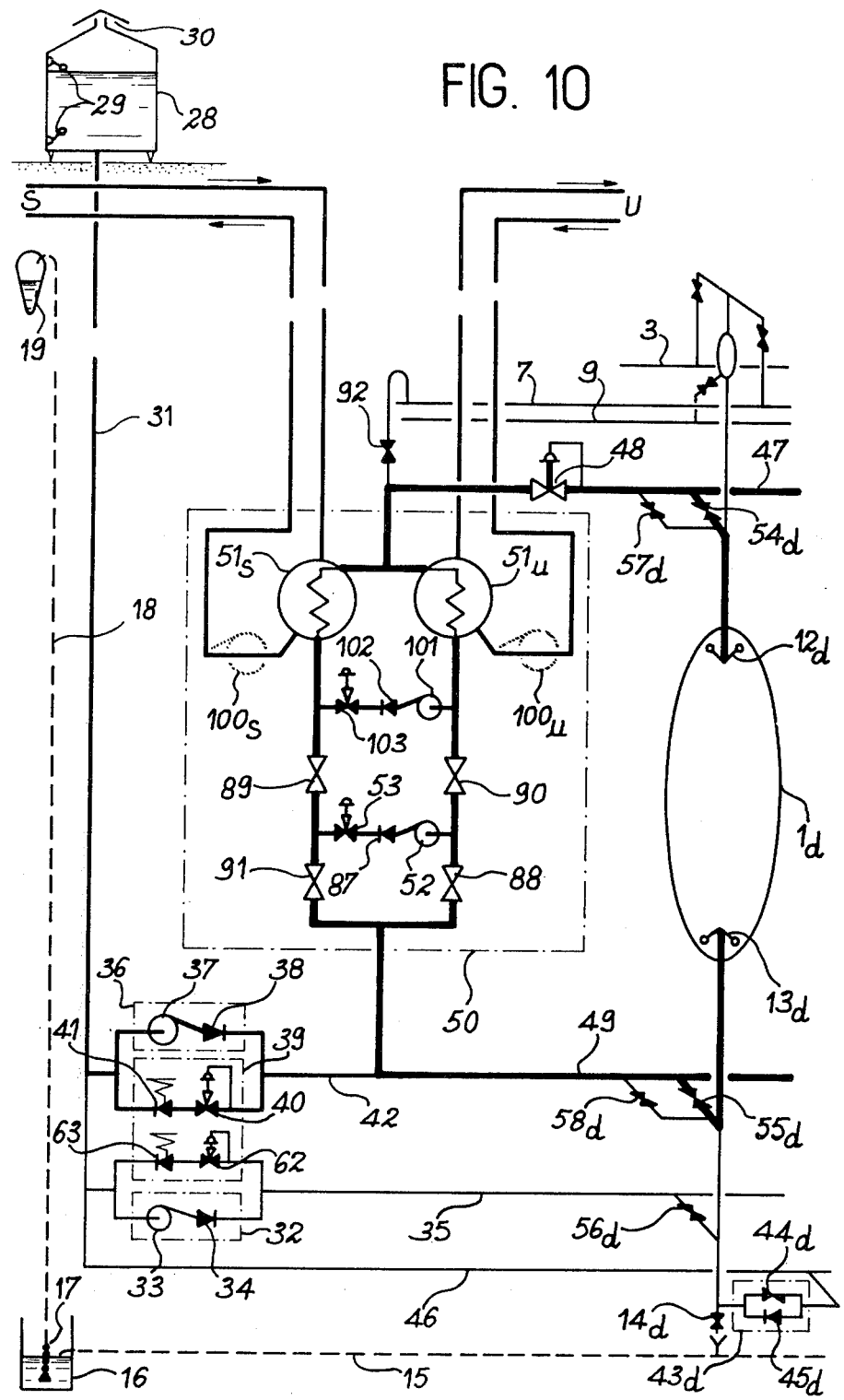
Figure 11:
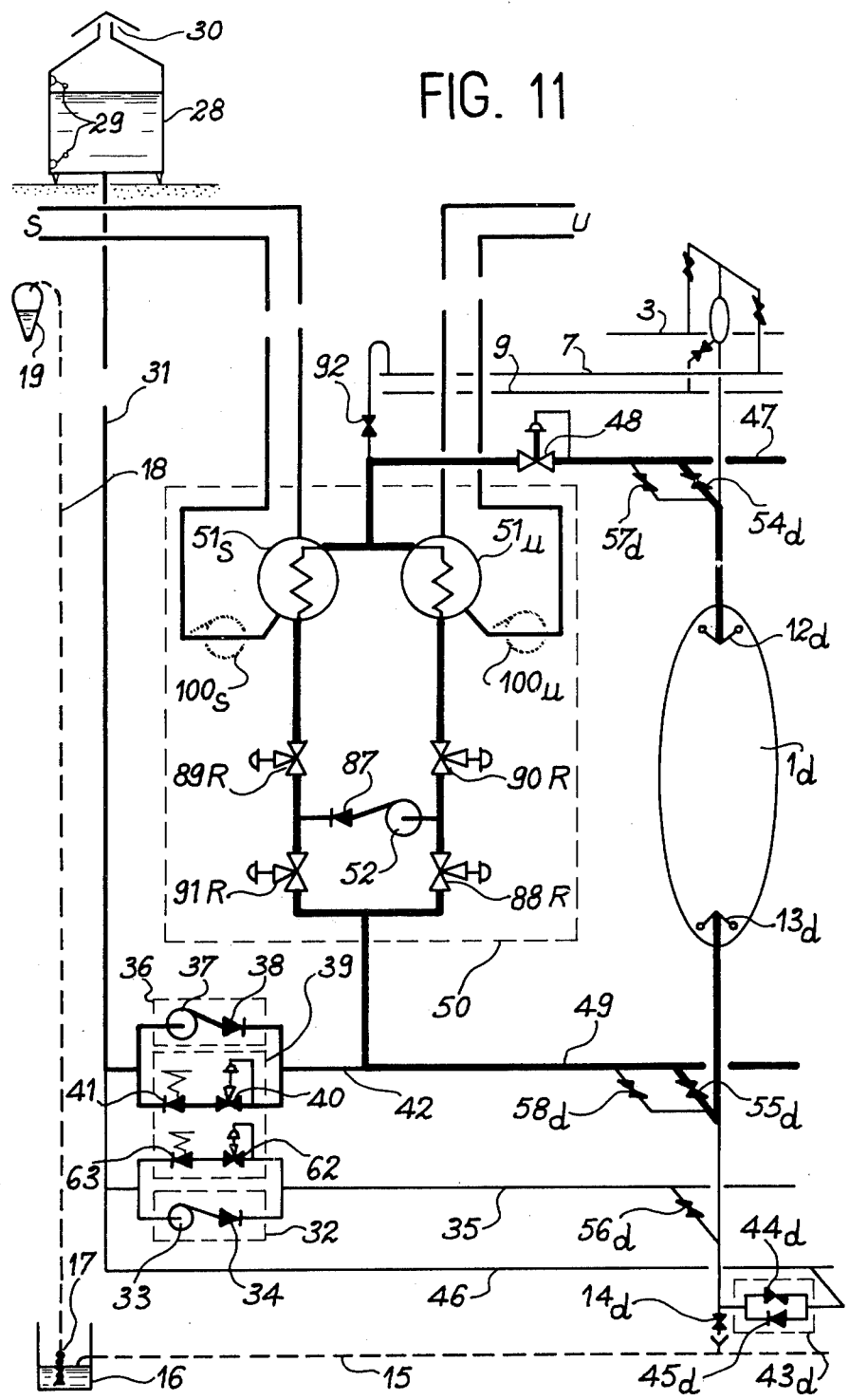
Figure 12:
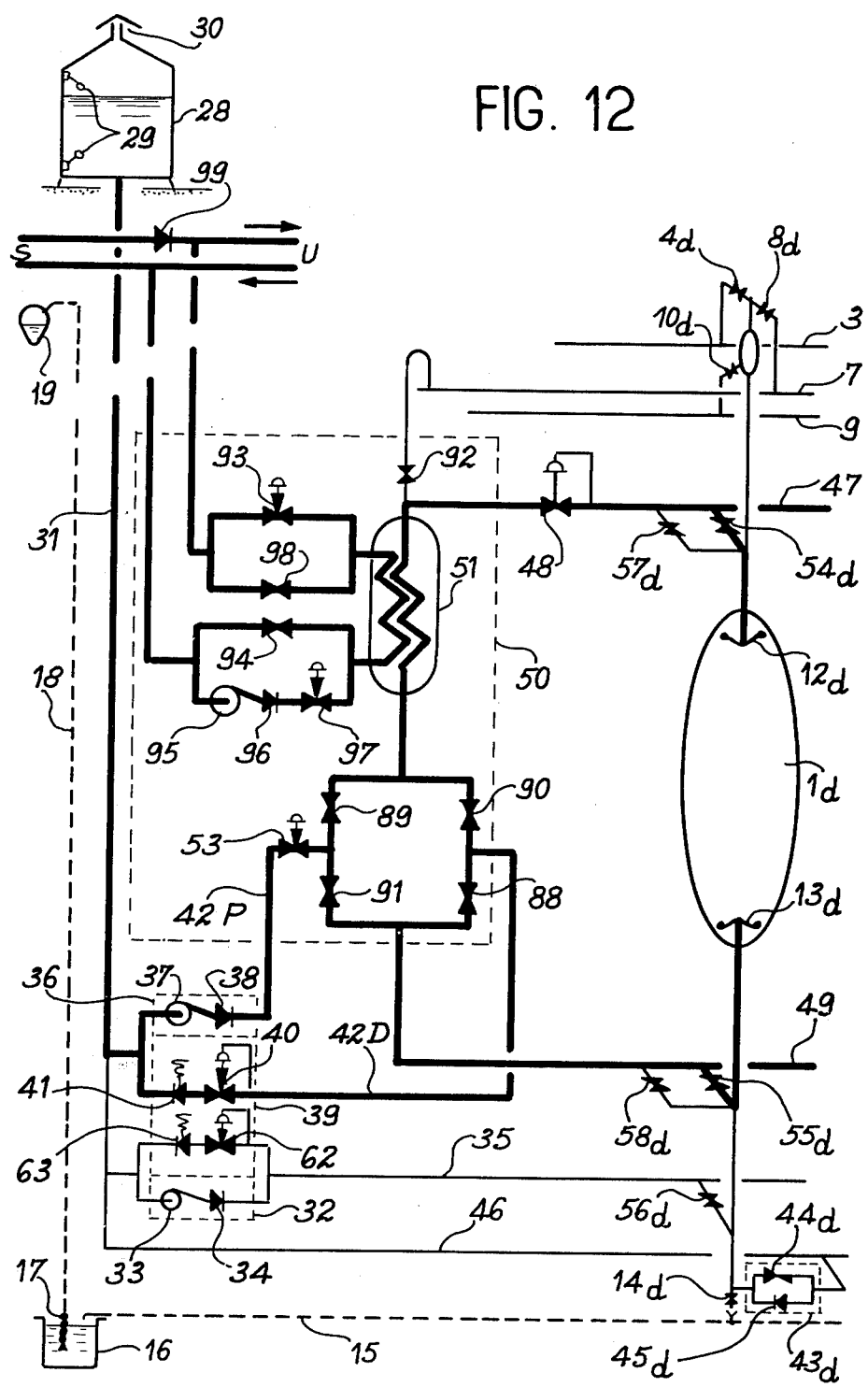
Figure 13:
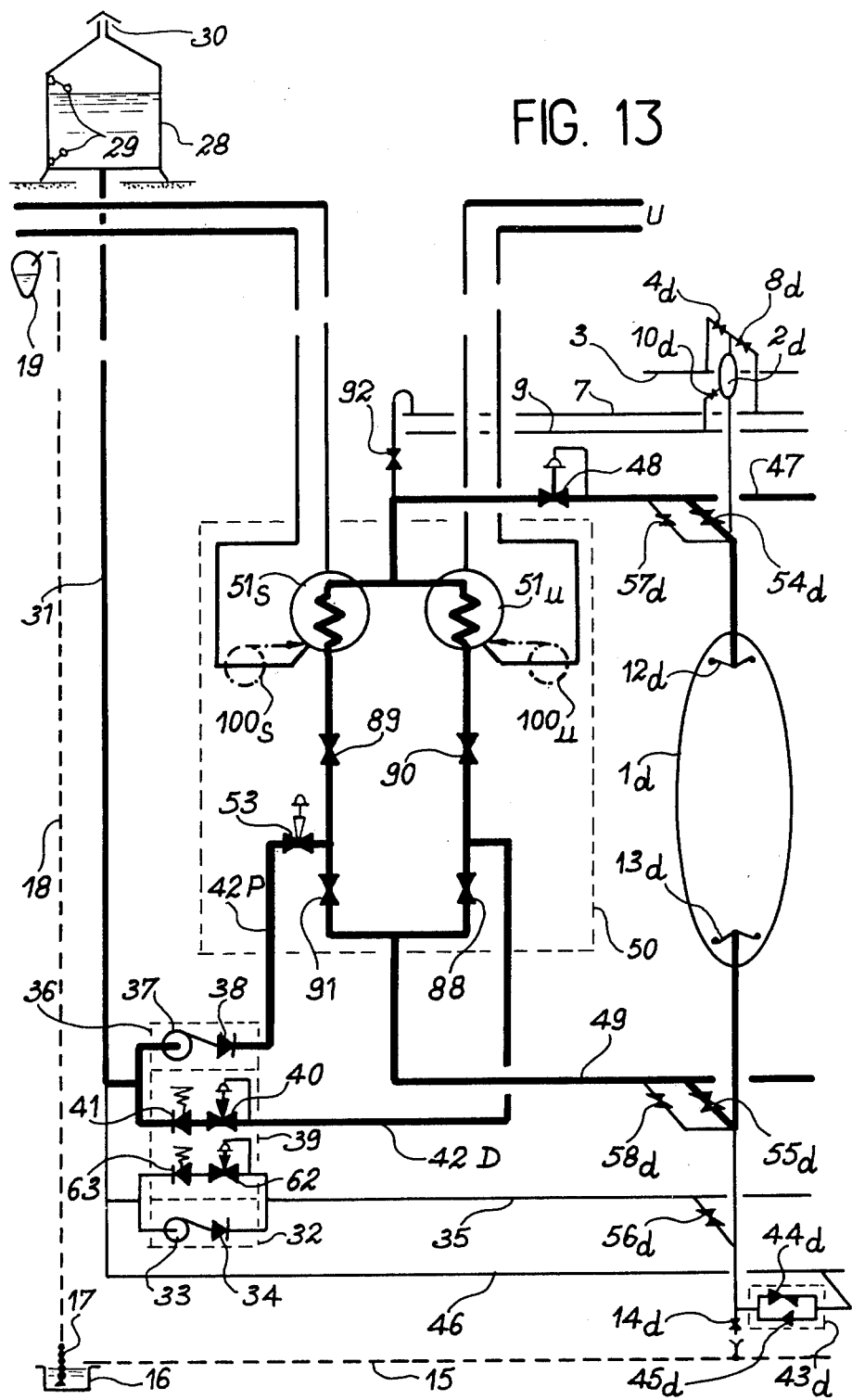
Figure 15:
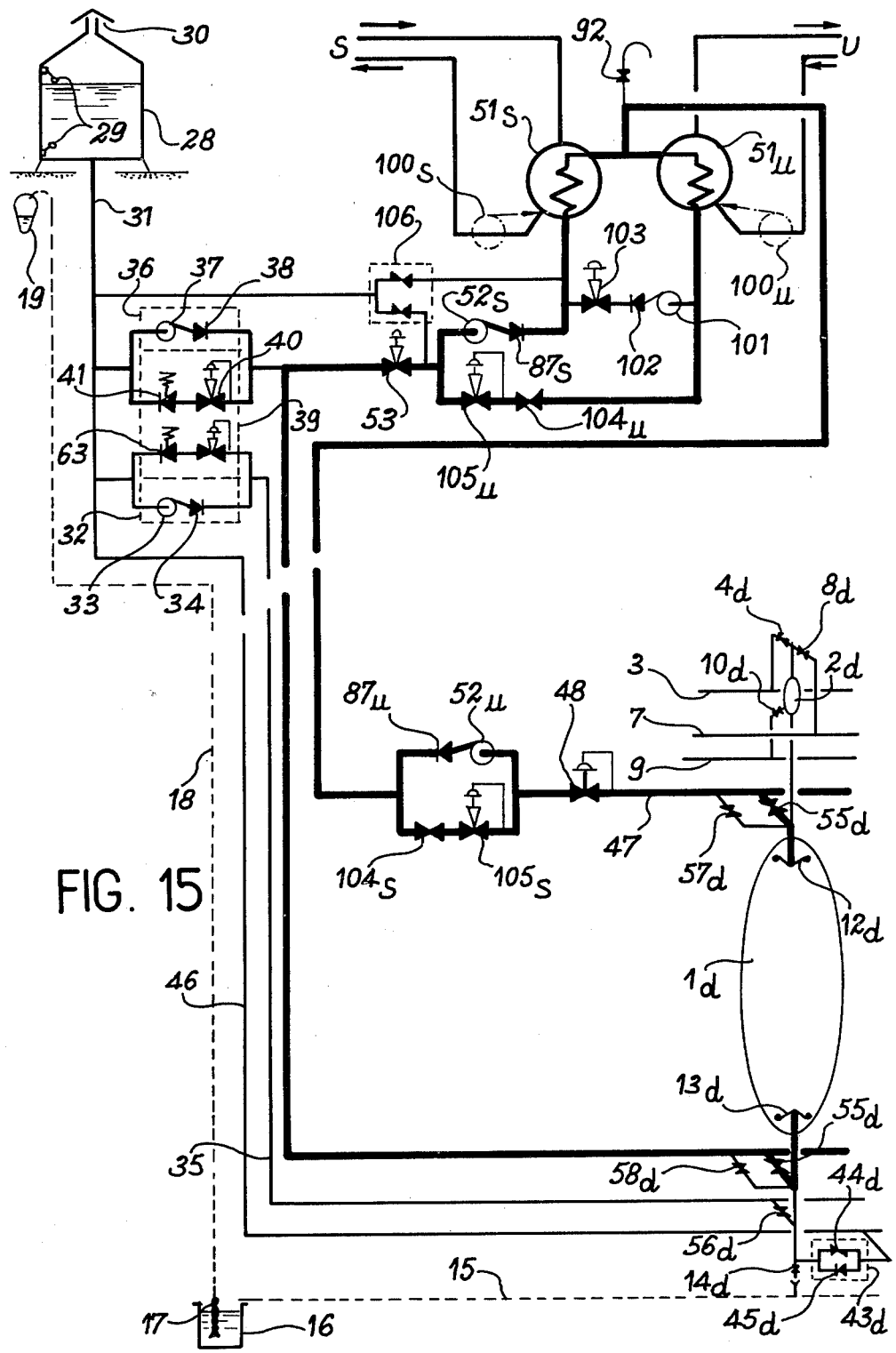
Figure 16:
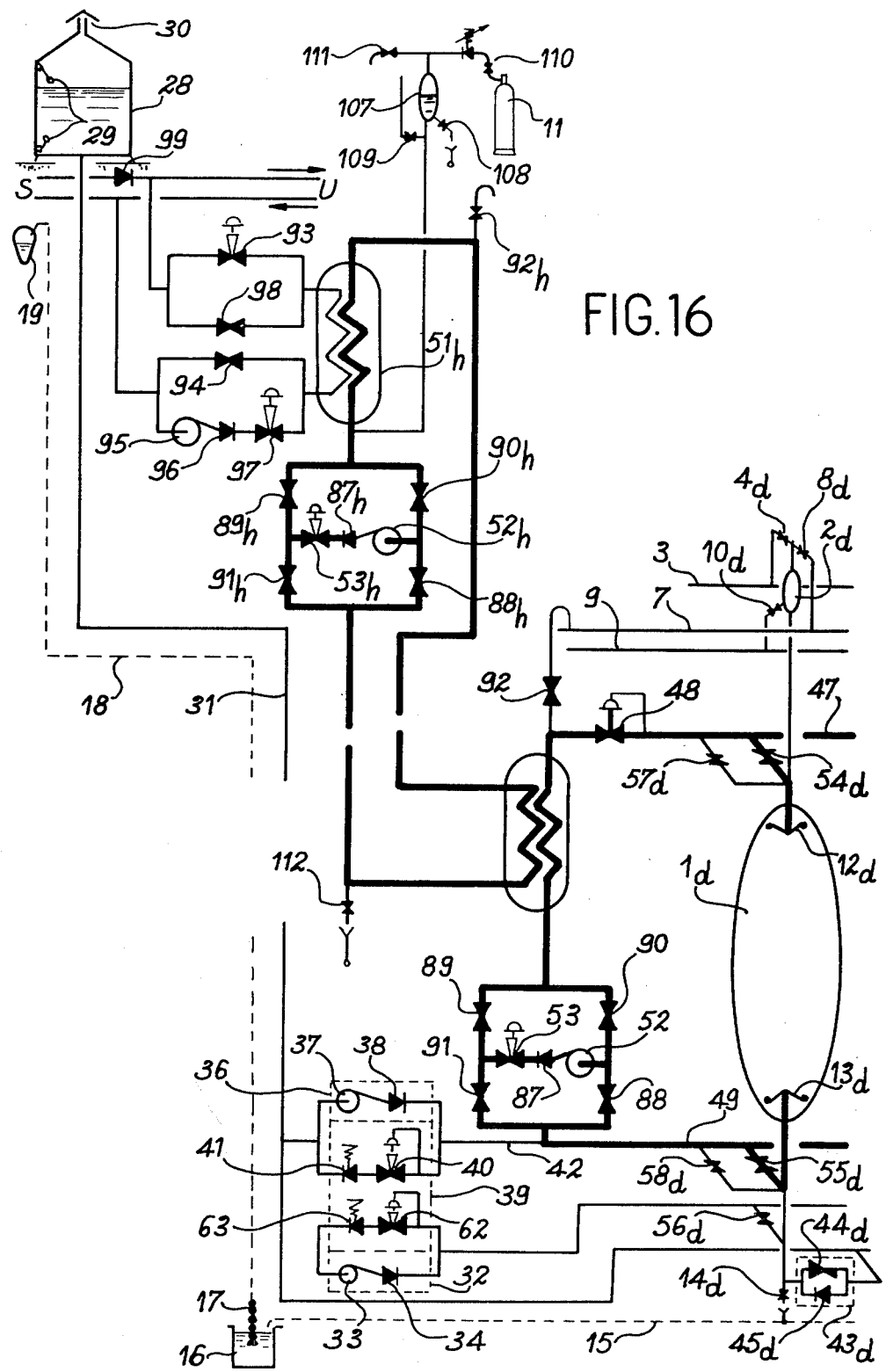
Figure 17:
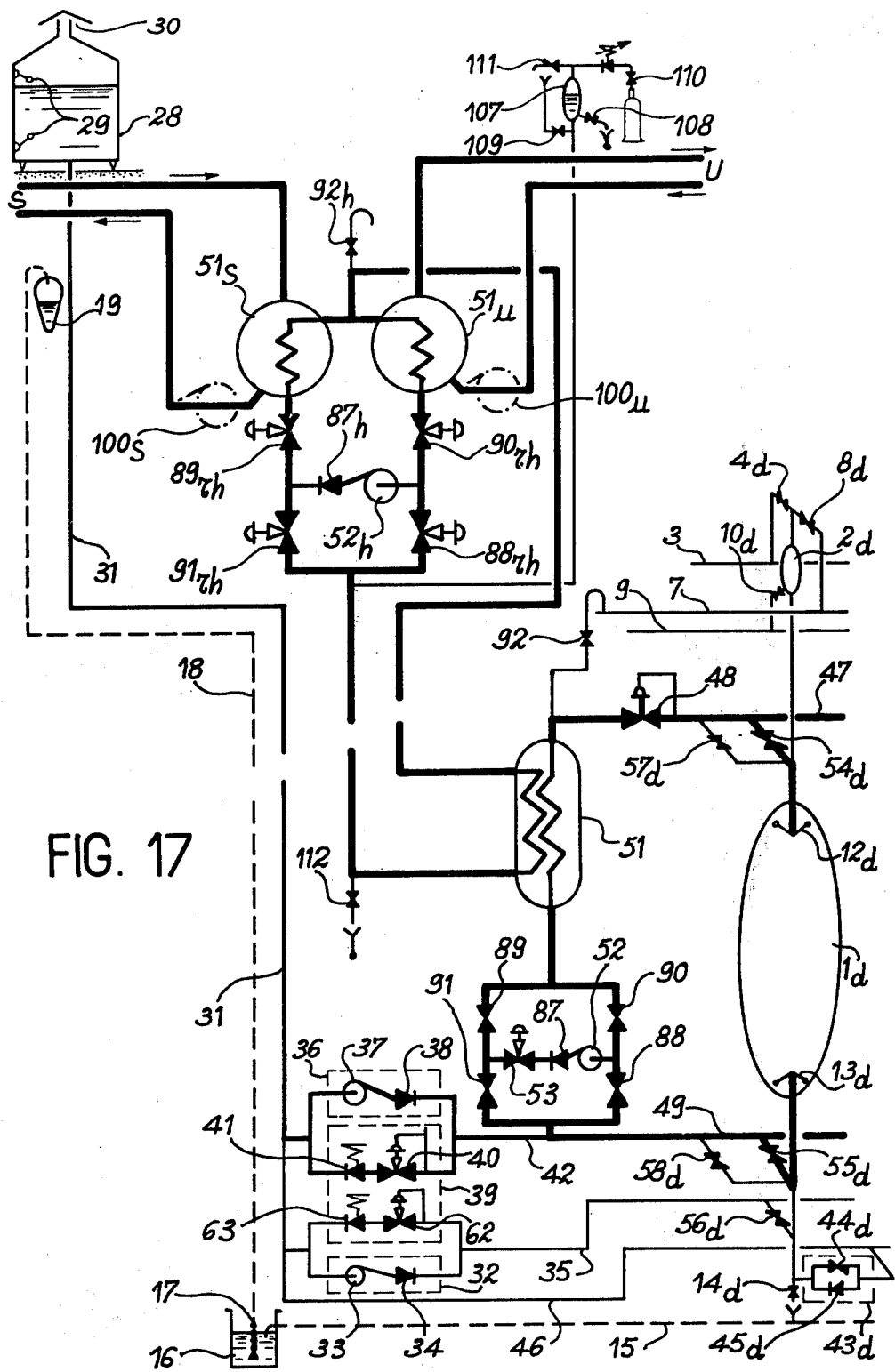
Figure 18:
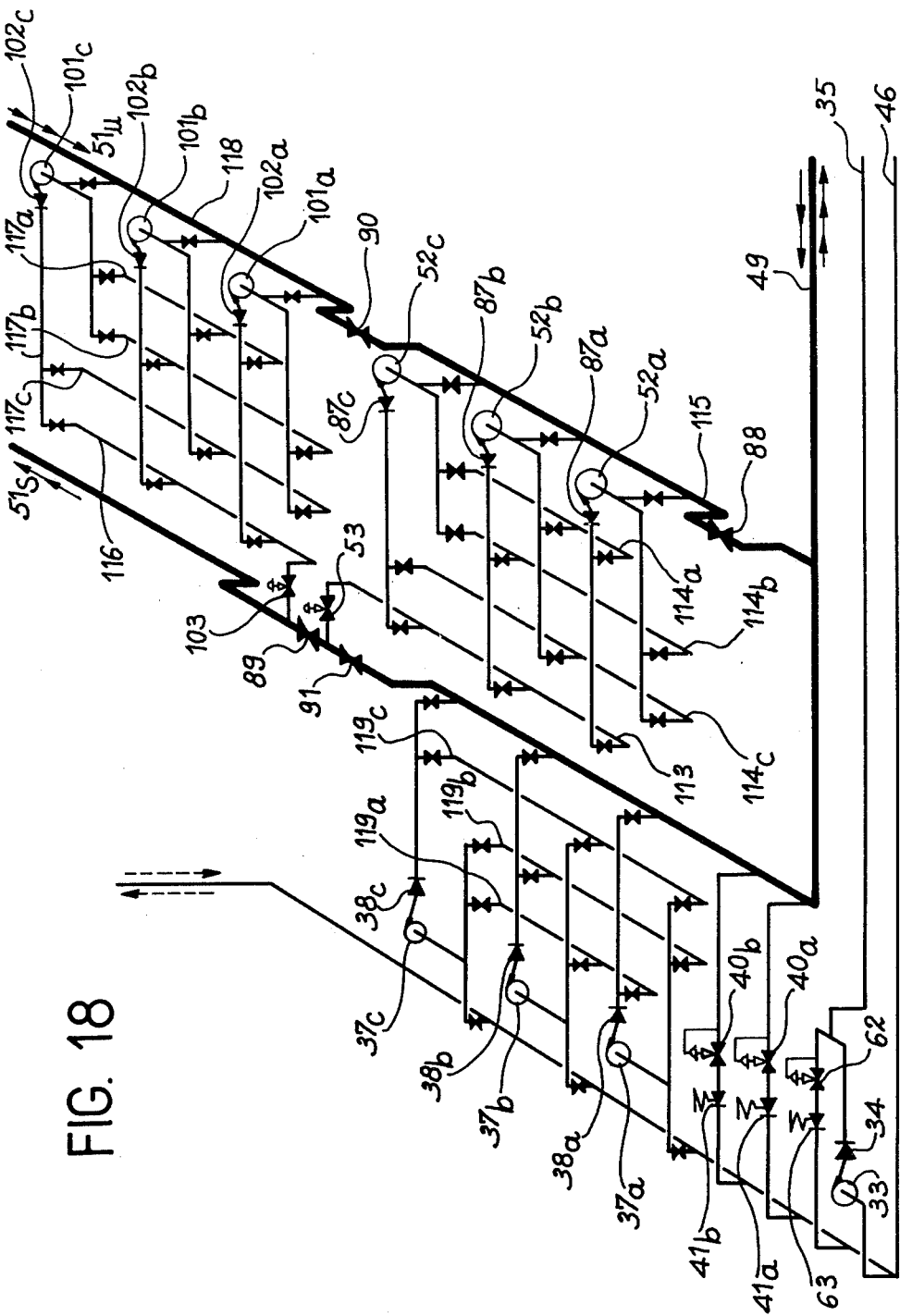

FIGS. 10 and 11 illustrate the mode of construction of a circulation and heat transfer circuit comprising two heat-exchanger units; one unit is used for heat storage and the other unit is used for heat recovery, with a possibility of direct heat transfer from the source to the utilization by means of an auxiliary pump (FIG. 10) or by means of the circulation pumping unit itself which is provided with four flow-regulating valves (FIG. 11);

FIGS. 12 and 13 illustrate an embodiment of the invention in which circulation and pressurization are carried out by a single pumping unit associated with one set of reversible heat exchangers (FIG. 12) or with two sets of heat exchangers (FIG. 13);

FIGS. 14 to 17 illustrate different embodiments of the invention for a high-pressure heat-transporting fluid in which provision is made for a device comprising a double circulation-pumping unit together with one set of reversible heat exchangers (FIG. 14) or two sets of heat exchangers (FIG. 15) and for a device having a double heat-exchange level provided at the top with either one set of reversible heat exchangers (FIG. 16) or two sets of heat exchangers (FIG. 17);

FIG. 18 shows the mode of construction of the main pumping station of the system of FIG. 10 which is considered by way of example and shows the advantage attached to the use of series-parallel connecting grids.

Figure 1:
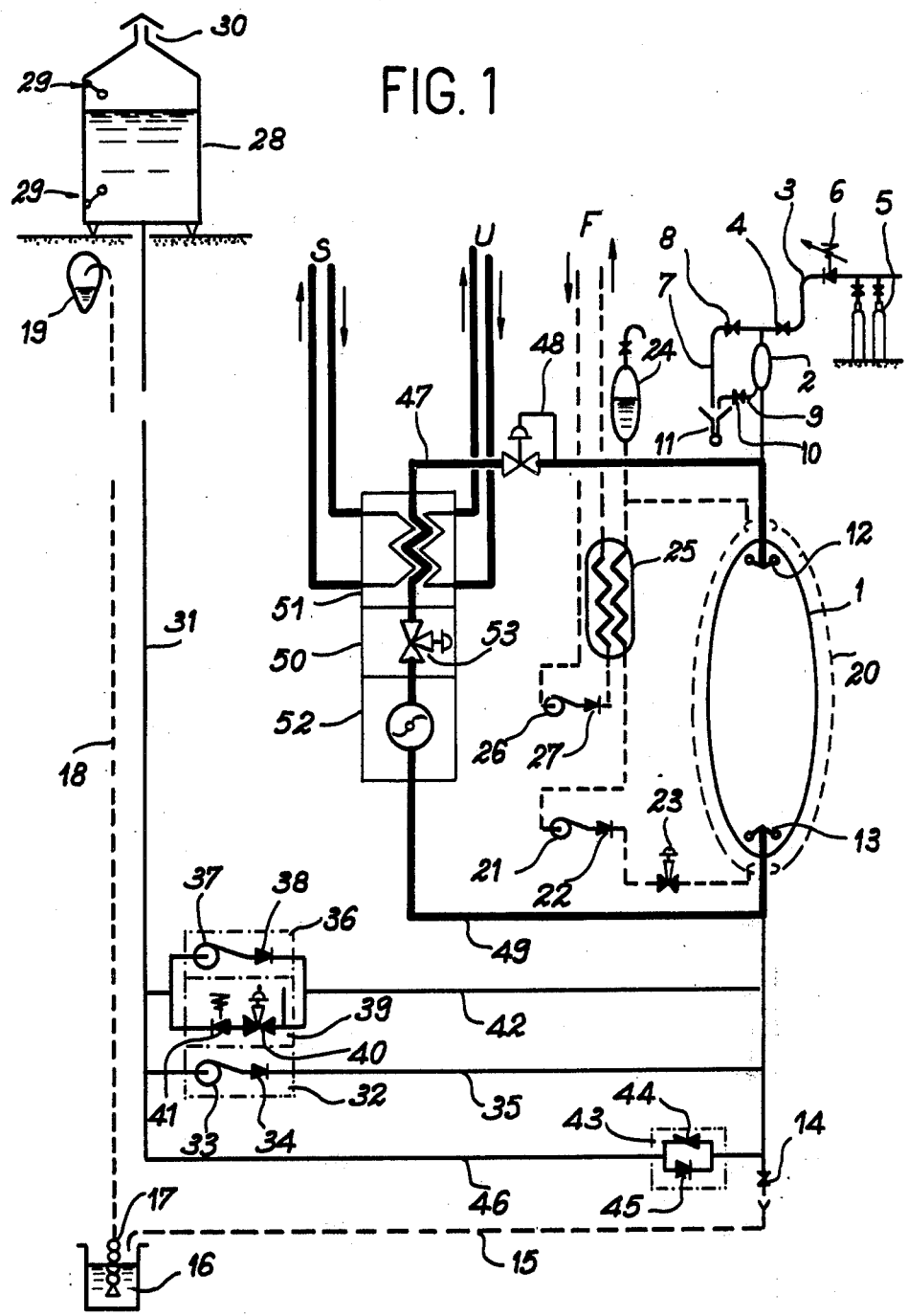
FIG. 1 is a general schematic diagram of the invention in which provision is made for only one cavity dug in the subsoil.

Reference being made to FIG. 1, there is shown a cavity 1 which has been dug in the subsoil and serves as a heat silo. In the upper portion of the cavity, the equipment comprises the auxiliary purge chamber 2 which is connected at the top end:

to a pipe line 3 for the supply of compressed gas through a control valve 4, the compressed gas being supplied from a set of cylinders 5 fitted with an expansion valve 6;

to a purge line 7 fitted with a shut-off valve 8; and which is connected at the bottom end to a heat-transporting liquid purge line 9 fitted with a shut-off valve 10.

The gas-purge line 7 and the liquid-purge line 9 are connected to a general purge collector 11.

The equipment of the cavity 1 further comprises a top injection-recovery unit 12 and the corresponding bottom unit 13, said units being placed within the cavity.

There are shown in dashed lines in FIG. 1 two optional but advantageous equipment units, namely as follows:

a general dewatering unit for recovering all liquids which tend to seep into underground installations and especially for draining the cavity by means of the drain-off valve 14. This device comprises a collecting duct 15 which extends to a transit sump 16 fitted with a dewatering pump 17 for discharging wastes through a dewatering pipe 18 to a general discharge outlet 19;

a unit for external cooling of the cavity 1 in accordance with French patent Application No. 76/36 283 and comprising a network 20 of cooling pipe lines in which an auxiliary heat-transporting fluid is circulated by means of a pump set 21 fitted with its check valve 22 and with a flow-regulating valve 23, an expansion device 24 and a heat exchanger 25, the second circuit of which comprises a pump set 26 fitted with its check valve 27 for effecting the circulation of an external fluid drawn from and returned to a cold source F such as a river, sea, lake, air coolant.

An expansion reservoir or vessel 28 located at the surface serves to fill the cavity 1 and to collect the excess heat-transporting liquid resulting from expansion. Said vessel is equipped with level-checking devices 29 and with a breather 30, and is connected to the pressurization and pressure relief means by an expansion line 31. The pressurization and pressure relief means comprise an initial-pressurization unit 32 constituted by a pump 33 and a checkvalve 34 connected to the base of the cavity 1 by means of an initial-pressurization line 35, a pressurization pumping unit 36 comprising a pump 37 and a check valve 38 mounted in parallel with a pressure relief unit 39 comprising a pressure-regulating valve 40 and a calibrated check valve 41, these two units being connected to the base of the cavity 1 by means of a pressurization-relief line 42, finally a safety unit 43 comprising a safety valve 44 and a check valve 45 for filling the cavity 1 which are mounted in parallel in a safety line 46 for establishing a communication between the base of the cavity 1 and the expansion line 31.

The circulation and heat-transfer circuit comprises a pipe line 47 for hot or cold circulation which is connected to the top of the cavity 1 and fitted with a normally-closed flow-arresting valve 48 which opens when the pressure within the cavity 1 passes below the minimum operating pressure mentioned earlier. Said circuit further comprises a bottom line 49 which permits circulation at the return temperature and is connected to the lower end of the cavity 1. The two circulation lines 47 and 49 are connected together by a set of means 50 comprising:

heat exchange means 51 for extracting heat from an external circuit connected to a heat source S and restoring heat to an external circuit connected to a utilization system U;

a pumping unit 52 for circulating the heat-transporting liquid in both directions;

regulating elements 53 for adjusting the rate of flow of the heat-transporting fluid in both directions according to the conditions imposed by the external circuits connected to the source S and the utilization system U.

FIG. 1 illustrates the general arrangement of the invention in the case of a single cavity and makes it possible to understand the operation of the device and its advantages as set forth in the foregoing. Accordingly, this figure calls for a number of observations:

(1) the pumps or pumping units 17, 21, 26, 33, 37 and 52 are represented schematically by a single pump but can obviously be groups of pumps suitably associated in accordance with accepted practice. One example of associations of this type is given in FIG. 18.

(2) the control valves, outlet valves, calibrated checkvalves 40, 41, 44, 48 are set in such a manner as to take into account the differences in dimensions and pressure drops within the pipe lines and eqoupment units.

(3) the units 32, 36, 39 and 43 are shown at the lower level of the installation. However, taking into account the above remark and this notwithstanding, these units can be installed either at the surface or in an intermediate position.

(4) in order to gain a clearer understanding of the operation, the pipe lines 35, 42, 49 and the "high-pressure" end of the line 46 have been individualized in the drawing. In the case of a single cavity 1, these pipe lines can be connected to each other and thus constitute a single basic line.

(5) the set of means 50 is represented diagrammatically by three juxtaposed rectangles, the practical construction of which depends on the characteristics of the external circuits which connect the system to S and U, examples being given hereinafter (with reference to FIGS. 9 to 17). This mode of diagrammatic representation takes into account the fact that the relative arrangement of the three elements 51, 52, 53 must not be considered as a characteristic feature of the invention. Said elements must be mounted in the circulation and heat exchange circuit between the pipe lines 47 and 49 but can be disposed in accordance with any desired relative arrangement and even intercalated.

Figure 2:
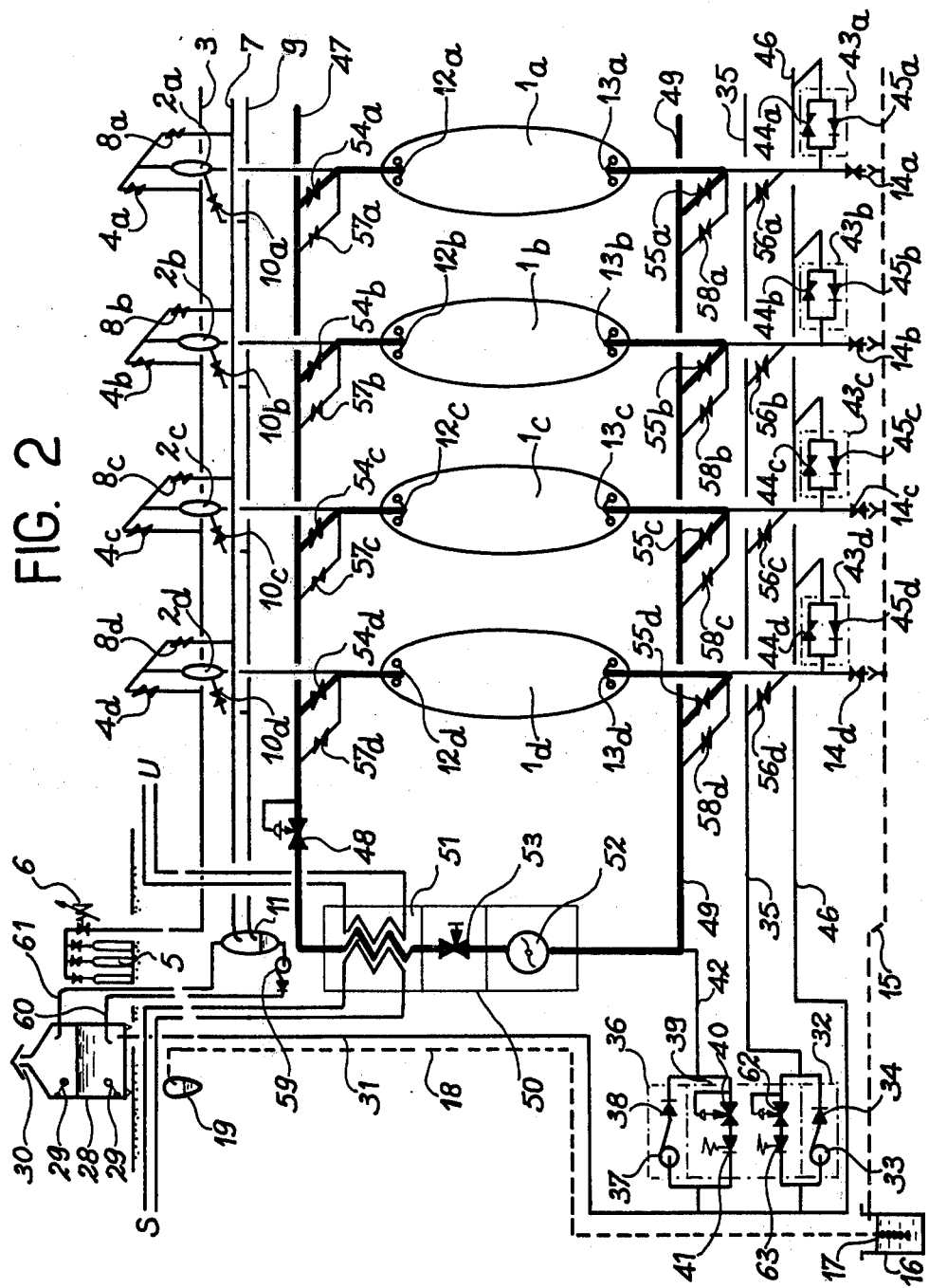
FIGS. 2 to 4 illustrate different modes of grouping in the case of a plurality of cavities: thus successive or parallel utilization is shown in FIG. 2, utilization in series is shown in FIG. 3 and multiple possibilities of utilization are shown in FIG. 4.

FIG. 2 shows the mode of construction of the system in the case of a plurality of cavities which are intended to be utilized successively or to be grouped together in parallel. Four cavities 1a, 1b, 1c, 1d are illustrated in this figure by way of example and are all equipped in the same manner. In the description which follows, consideration will therefore be given only to the cavity 1a and to the units and assemblies which are common to all the cavities.

The cavity 1a is equipped with an auxiliary purge chamber 2a connected at the top end thereof to the common compressed gas supply line 3 through the control valve 4a and to the common gas purge line 7 through the control valve 8a; the auxiliary purge chamber 2a is also connected at the lower end to the common heat-transporting liquid purge line 9 through the control valve 10a. As in the case of FIG. 1, provision is made within the cavity 1a for a top injection-recovery device 12a and the corresponding bottom device 13a. Below the cavity 1a, provision is made for a complete safety unit 43a comprising the safety outlet valve 44a and the filling check valve 45a which are connected to the common safety line 46, and the drain-off valve 14a which is in communication with the common collecting duct 15. The upper end of the cavity 1a is put into communication with the common hot-liquid circulation line 47 through a control valve 54a; moreover, the lower end of the cavity 1a is put into communication with the common bottom circulation line 49 at the return temperature and with the common initial-pressurization line 35, respectively to the control valve 55a and 56a. It will be noted that the two circulation valves 54a and 55a are each duplicated by a small auxiliary circulation valve designated respectively by the references 57a and 58a and mounted in parallel with the main control valve.

The entire group of cavities is finally connected to all the common utilization means by means of seven pipe lines 3, 7, 9, 35, 46, 47, 49 and by means of the collecting duct 15. As in FIG. 1, the compressed gas supply line 3 is connected to an assembly of gas cylinders 5 fitted with an expansion valve 6. The general purge collector 11 connected to the gas purge line 7 and the liquid purge line 9 is constituted in this case by a small cavity or collector-tank. The gas purge line 7 extends to the top portion of said collector-tank and the liquid purge line 9 extends to the bottom portion. The lower end of the general purge collector is connected to a purge-transfer pump set 59 which makes it possible by means of a purge-transfer line 60 to return the heat-transporting liquid derived from the purge outlets to the expansion vessel 28. The upper end of the general purge collector is connected to the atmosphere of the expansion vessel 28 through a pressure-equalizing line 61. The initial-pressurization line 35 is connected to the initial-pressurization unit 32 in accordance with the description of FIG. 1. The safety line 46 is connected to the expansion vessel 28 by means of the expansion line 31. The top circulation line 47 is fitted with a flow-arresting valve 48 and connected to the first pole of the set of heat transfer-circulation-regulation means 50. The bottom circulation line 49 is connected to the second pole of the means 50. It is noted that no provision is made for a common pressurization-pressure relief line assigned to each cavity. Since pressurization and pressure relief are directly related to the flow, the same circulation line 49 can carry out all these functions. Under these conditions, the pressurization-relief line 42 is connected directly to the bottom circulation line 49; as in FIG. 1, pressurization is ensured by the pressurization-pumping unit 36 whilst pressure relief is effected by means of the pressure-regulating valve 40 and the calibrated check-valve 41 of the pressure relief unit 39. It is apparent that said relief unit 39 comprises a second pressure relief line constituted by a pressure-regulating valve 62 and a calibrated check-valve 63 and connected in parallel with the initial-pressurization unit 32. This arrangement makes it possible to ensure initial pressurization of a cavity in the normal manner during normal utilization of another cavity. The expansion means are in any case in accordance with FIG. 1 and the same applies to the optional equipment units: dewatering device and device for external cooling of the cavities (this device having been omitted from the figure).

This type of assembly permits successive utilization of cavities. Thus, after initial pressurization of the first cavity such as the cavity 1a, for example, and by virtue of the initial-pressurization unit 32, the pipe line 35 and the control valve 56a which is open, heat storage can be initiated as a result of opening of the control valves 54a and 55a, thus causing the flow-arresting valve 48 to open. A small flow of heat-transporting fluid which is heated in the heat-transfer means 51 is delivered towards the cavity 1a through the top circulation line 47 by the pumping means 52 employed for fluid circulation. As a result of expansion, a larger flow of cold heat-transporting fluid is discharged through the pipe line 49. The excess quantity is passed into the expansion vessel 28 through the line 42, the pressure-regulating valve 40, the calibrated check-valve 41 and the line 31. When the upper portion of the cavity 1a is hot, the flow can be brought to its normal value without any attendant danger of mixing. Prior to or during heating of the cavity 1a, pressurization of the cavity 1b is carried out by means of the initial-pressurization unit 32, the line 35 and the control valve 56b which is open. When the cavity 1a is almost completely heated, a small part of the flow is diverted towards the cavity 1b by means of the auxiliary circulation valves 57b and 58b. Heating of the upper zone of the small-flow cavity 1b is thus ensured without any reduction of the total flow. This proves particularly advantageous as will become apparent from the description of FIG. 5. When the cavity 1a is completely hot, the control valves 54b and 55b are opened and the total flow passes through the cavity 1b after closure of the control valves 54a, 55a, 57a, 58a. Similar operations permit good heat recovery performance after starting-up the pressurization-pumping unit 36. It may be noted that a plurality of cavities in parallel can be put into service simultaneously and this makes it possible at high rates of flow to limit any disturbances which could arise when putting cavities into service successively.

Figure 3:
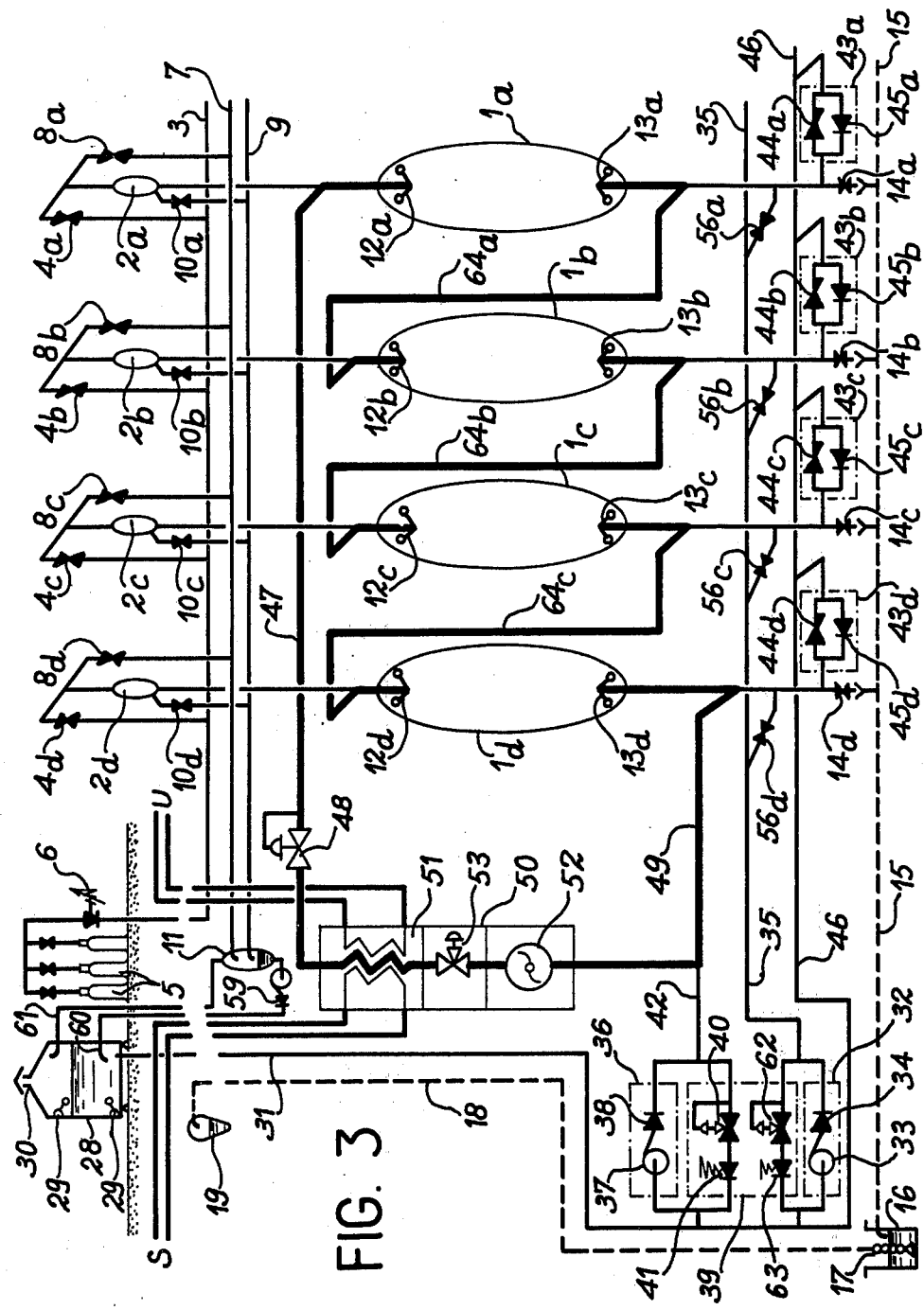

FIG. 3 shows another arrangement of the cavities which permits utilization of these latter in series. The diagram is very similar to that of FIG. 2 but differs from this latter in that:

the top circulation line 47 is connected directly to the top of the cavity 1a and is not connected to the other cavities;

the bottom circulation line 49 is connected directly to the bottom of the last cavity 1d and is not connected to the other cavities;

a series-connecting line 64a joins the bottom of the cavity 1a to the top of the cavity 1b; a line 64b joins the bottom of the cavity 1b to the top of the cavity 1c and so forth until the last cavity;

the initial-pressurization line 35 is connected to the bottom circulation line 49 or to the bottom of the last cavity.

In consequence, the control valves 54, 55, 56, 57 and 58 of the diagram of FIG. 2 no longer serves any useful purpose in this instance. It should be pointed out in addition that the pressure relief unit 39 is not necessarily provided any longer with the second pressure-relief line comprising the pressure-regulating valve 62 and the calibrated check-valve 63 in parallel with the initial-pressurization unit 32 as was shown in FIG. 2.

In fact, the permanent connection which now exists between the initial-pressurization line 35 and the bottom circulation line 49 makes it possible for the main line of the pressure-relief unit to ensure pressure equalization during the initial pressurization. It should further be noted that provision need be made in accordance with the invention for only one safety unit 43 in the entire system. It does nevertheless seem an advantage to assign a safety unit to each cavity in order to guard against any danger which might arise from unpredictable operational disturbances. The utilization of cavities in series simplifies the installation and the operating program but is subject to two defects:the increase in the lukewarm fringe between the hot heat-transporting liquid and the heat-transporting liquid at the return temperature as a result of transfer of said fringe from one cavity to the next during both storage and recovery, as well as the temperature drop resulting from disturbances which take place at the top of each cavity at the time of storage and at the bottom of each cavity at the time of heat recovery. This type of assembly is therefore more particularly suited to storages of long duration at a relatively low temperature and for applications in which the recovery temperature is not a highly restrictive parameter.

Figure 4:
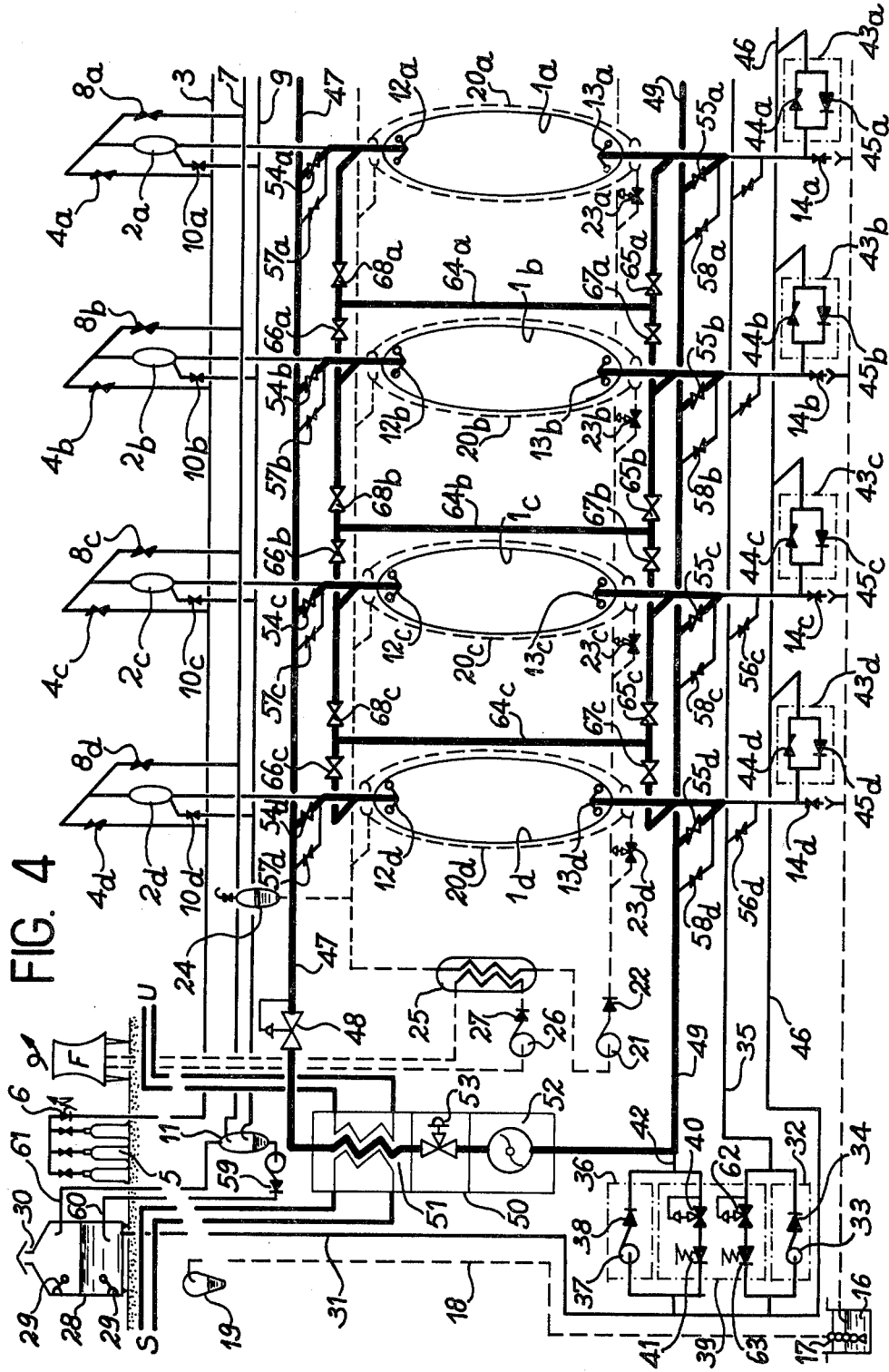

FIG. 4 shows a system comprising four cavities which are capable of operating individually, in series, in parallel or in series-parallel. The diagram is in accordance with FIG. 2, to which are added the series-connection lines 64a, 64b and 64c; it is noted that the end of each line is connected to two successive cavities by means of control valves such as the valves 65a, 66a, 67a and 68a, thus permitting two possibilities of series connection. Other types of connections can clearly be contemplated on the same principle. FIG. 4 also shows a mode of connection of the end cooling device for the cavities in accordance with our French patent No. 76/36 283 and in the case of a plurality of cavities. The diagram in this case is similar to that of FIG. 1 but it is observed that a flow-regulating valve 23 is provided for each cavity and the regulating-valve 23a corresponds for example to the cavity 1a. It should be noted that FIG. 4 is a general arrangement diagram which does not imply any basic assumptions in regard to the spatial distribution of the cavities and different equipment units and the same remark applies to the other figures. A particular result thereby achieved is that the above-mentioned series-connection lines 64a, 64b, 64c can be placed in a well, a bore-hole or in a single assembly. Another remark concerns the filling check-valve (such as the valve 45a) of each safety unit such as the unit 43a. In order to prevent implosion of the cavity in the event of depressurization, it is important to ensure that said filling check-valve can operate freely under all circumstances during utilization. It is for this reason that provision has not been made for any shut-off valve in series with said check valve. In practice, this arrangement can prove objectionable since it prevents the possibility of draining a single cavity, for example in order to carry out periodic inspections, maintenance or repair operations after opening of the purge outlet. For this reason, consideration can be given to the possibility of installing a device for locking said filling check-valve in the closed position or a shut-off valve placed in series (not contemplated in the figures and especially in FIG. 4). It is necessary in that case, however, to make provision for special equipment or for a special procedure with a view to ensuring that the device for locking the filling valve can be neutralized in a reliable manner or that the shut-off valve is maintained in the open position in all cases in which draining of the corresponding cavity is not contemplated.

Figure 5A:
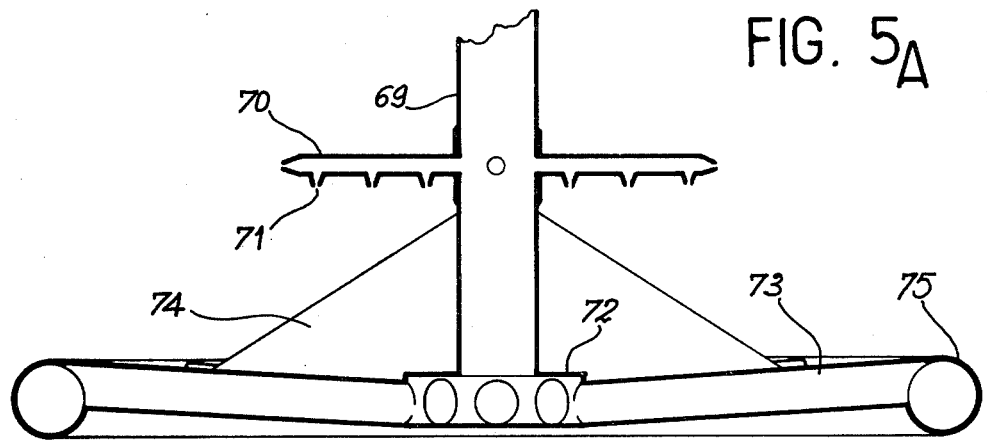
FIG. 5a is a vertical sectional view and FIG. 5b is a top view.
Figure 5B:
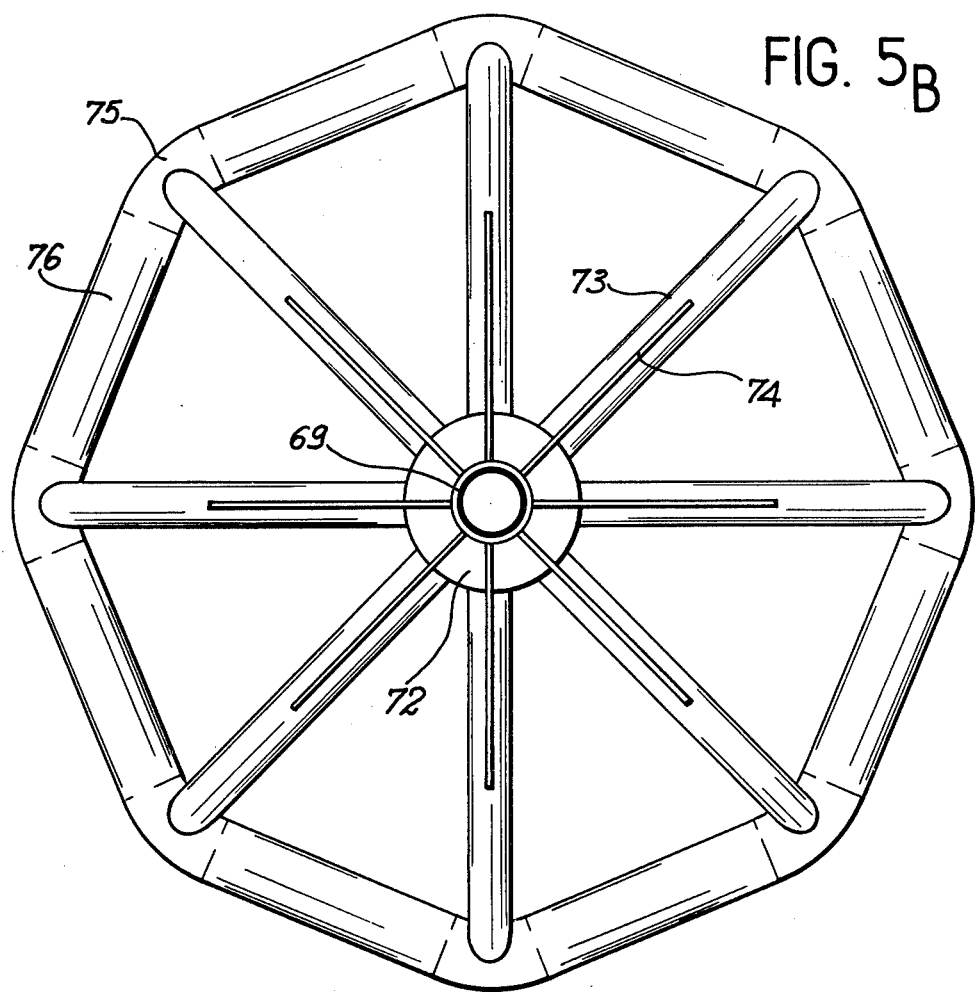

There is shown in the vertical sectional view of FIG. 5A one advantageous mode of construction of a top injection-recovery equipment unit for a cavity having a vertical axis of revolution whilst FIG. 5B shows a top view. The corresponding bottom equipment unit is symmetrical with the equipment unit shown with respect to a horizontal plane. There are connected to the upper portion of the vertical pipe 69 a number of small horizontal initialization pipes 70 pierced by slits or holes or provided with nozzles 71 (not shown in FIG. 5B).

At the lower end of the vertical pipe 69, a distribution box 72 is connected to supply pipes 73 which are supported by suitable means such as the gusset-plates 74. The supply pipes 73 are connected to union elbows 75 constituting the vertices of a polygon. Between each set of two consecutive union elbows 75 is placed a peripheral pipe 76 pierced by a slit or by orifices or provided with nozzles. It should be noted that the peripheral pipes 76 are all connected at both ends to the vertical pipe 69 through the intermediary of the distribution box 72, the supply pipes 73 and the union elbows 75. The nozzles 71 or the holes or slits of the horizontal initialization pipes 70 are so designed as to introduce a very high pressure drop in the case of an injection or a recovery at the maximum flow rate and at the temperature considered.

In accordance with the design arrangements described in the foregoing, these injection-recovery units permit easy prefabrication of elements which have small dimensions and which can readily be assembled within the cavity to be equipped.

The operation is as follows: at the commencement of heat storage or recovery within a cavity, a small flow is injected or withdrawn through the vertical pipe 69 and then passes easily through the horizontal initialization pipes 70 which introduce only a low pressure drop. This small flow is obtained either by adjusting the total flow or, in multiple-cavity storage systems, by diverting a small fraction of the flow which is directed into another cavity during utilization by means of auxiliary valves (namely the valves 57 and 58 which are shown in particular in FIGS. 2 and 4). When the hot heat-transporting liquid reaches the level of the peripheral pipes 76 of the top unit during the storage stage or when the cooled heat-transporting liquid reaches the level of the peripheral pipes 76 of the bottom unit during the recovery stage, the flow rate can be increased at will to its maximum value. An increase in pressure drops at the level of the initialization pipes limits the flow rate which decreases to a small value along this path whilst the main part of the flow must then pass through the peripheral pipes 76. By virtue of the plurality of supply pipes 73 and the fact that each peripheral pipe 76 is supplied at both ends, thus ensuring good pressure equalization, the injection-recovery equipment accordingly ensures uniform injection or withdrawal, a judicious arrangement of the peripheral pipes 76 and suitable orientation of their slits, orifices or nozzles, thus making it possible to limit disturbances in the contact zone between liquids at different temperatures, even in the case of very high rates of flow.

When a cavity does not have a vertical axis of revolution, the injection-recovery units can have an arrangement which is different from that shown in FIGS. 5A and 5B: in particular, recourse can be had to a number of interconnected distribution boxes for supplying a set of peripheral pipes so arranged as to form one or a number of polygons whilst the foregoing description and mode of operation otherwise remain identical.

The injection-recovery units mentioned above can readily be employed in cavities containing a porous and permeable material subject to the following adaptations:

(1) the pipes and especially the vertical pipe 69 comprise one or a number of expansion-compensating devices such as a bellows-type expansion joint or sliding joint.

(2) the initialization pipes 70 and the peripheral pipes 76 are screened pipes of a standard or reinforced type such as those employed in water-collecting operations or oilwell drilling operations; the pressure drop conditions are clearly maintained if necessary by means of auxiliary devices such as diaphragms which are fixed at the point of connection of the screened pipes which serve as horizontal initialization pipes 70 and as the vertical pipe 69.

It is apparent from FIGS. 6A and 6B that, in addition to the expansion vessel 28, the expansion means aforesaid comprise a buffer chamber constituted by an additional cavity 1t which is fitted with all the equipment units of the main cavities, which has a volume at least equal to the volume of the expansion vessel 28 and which is connected to the pressurization-relief line, either on the "high-pressure" side of the pressurization pumping unit 36 and of the pressure relief unit 39 (as shown in FIG. 6A) or on the "low-pressure" side of these two units (as shown in FIG. 6B). A set of three control valves serves to put the buffer cavity 1t into service or out of service, namely two combined-operation valves 55t and 65t which operate in opposition to the valve 77t. Closure of the valve 77t and opening of the two valves 55t and 65t have the effect of putting the cavity 1t in series with the pressure-relief and pressurization units by means of the series-connection line 64t.

It is worthy of note that an initial-pressurization valve 56t, a safety unit 43t and an auxiliary purge chamber 2t fitted with suitable control valves permit correct and reliable operation of the cavity 1t. This cavity can be put out of service by opening the valve 77t and closing the two valves 55t and 65t. The buffer chamber permits operation of the system in accordance with the invention when the maximum and minimum temperatures of the heat-transporting liquid are such that, taking into account the conductive heat build-up of the less hot fraction of the heat-transporting liquid, this latter can attain or does attain a temperature which is higher than its vaporization temperature at atmospheric pressure, with the result that it is not liable to be directly discharged to the expansion vessel 28 by the pressure-relief means 39 at the time of heat storage. By means of the assembly shown in FIG. 6A, this heat-transporting liquid in an excessively hot state can accordingly be returned into the buffer chamber 1t, thus displacing the initially colder heat-transporting liquid contained in this latter towards the expansion vessel 28 through the intermediary of the pressure-relief means 39. As can readily be understood, the cavity 1t can be short-circuited by means of the valve 77t if the temperature does not justify the use of this latter. At the time of recovery, however, the pressurization flow produced by the pressurization pumping means 36 must necessarily pass through the cavity 1t as a result of closure of the valve 77t and opening of the valves 55t and 65t if the cavity 1t has been put into service at the time of the heat storage stage. The assembly shown in FIG. 6B makes it possible to eliminate high pressures within the cavity 1t if the simple hydrostatic pressure corresponding to the column of heat-transporting liquid between the expansion vessel 28 and the top of the cavity 1t is sufficient to prevent boiling of the heat-transporting liquid contained in said cavity. This corresponds to the case of storages of heat-transporting liquid at high temperature for periods of very short duration with return to a temperature which is slightly higher than the vaporization temperature at atmospheric pressure.

It is clear that the use of a plurality of cavities in series, in parallel or in series-parallel providing the same useful volume can be contemplated instead of a buffer chamber constituted by the single cavity 1t shown in FIGS. 6A and 6B.

Figure 7A:
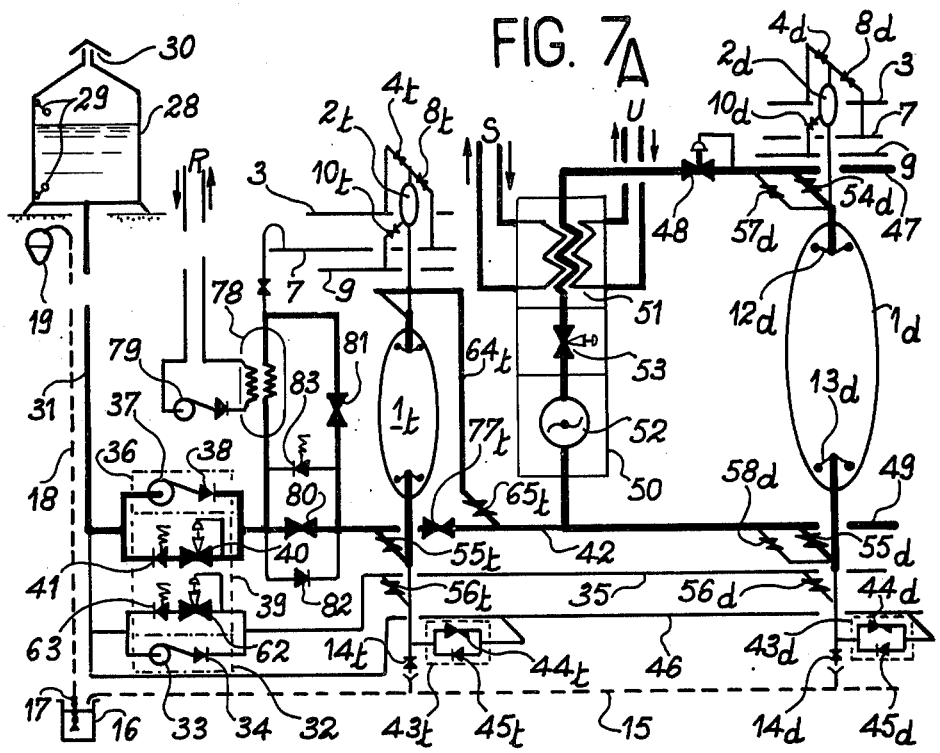
FIG. 7a is a general arrangement diagram and FIG. 7b shows an embodiment which is more especially adapted to a buffer cavity in the high-pressure position.

From FIG. 7A, it is seen that the buffer chamber 1t can advantageously be completed by auxiliary means for cooling the heat-transporting liquid. Said means comprise at least one auxiliary heat exchanger 78 provided with purge devices which permit initial filling of this latter. One of the auxiliary heat-exchanger circuits is coupled to an external cold source R by means of suitable pumps 79 for effecting the circulation of an auxiliary heat-transporting fluid. The heat-transporting liquid which is discharged from the buffer chamber 1t during the heat storage stages can pass through the second circuit of the auxiliary heat exchanger aforesaid. A short-circuit valve 80 which operates in opposition to a supply valve of the heat exchanger 81 makes it possible to put the auxiliary heat exchanger 78 out of service during the heat storage stages when the temperature of the heat-transporting liquid is lower than its vaporization temperature at atmospheric pressure and during the heat recovery stages. The flow then takes place from the expansion vessel 28 to the main cavities through the intermediary of the pressurization pumping means 36. A pressurization check-valve 82 for ensuring flow in this direction and preventing flow in the opposite direction makes it possible in addition to ensure pressurization at the time of heat recovery even in the event of faulty positioning of the valve 80. Similarly, a calibrated safety valve 83 makes it possible during the heat storage stages to short-circuit the heat exchanger 78 if this latter introduces an excessive pressure drop or prevents circulation of the excess flow of heat-transporting fluid as a result of defective operation caused by scale formation, by faulty coordination of the control valves 55t, 65t and 77t or for any other reason. The calibrated check-valve 78 is adjusted so as to ensure pressure relief in respect of a value of pressure which is higher than the reference pressure mentioned earlier but lower than the above-mentioned safety pressure. The heat-transporting liquid can be restored to a suitable temperature by said auxiliary cooling means and is discharged from the buffer chamber 1t towards the expansion vessel 28 through the pressure-relief means 39 in the event that, after a long residence period within the buffer chamber 1t, the discharged heat-transporting liquid at the return temperature has brought the cold heat-transporting liquid to an unacceptable temperature as a result of thermal conduction. It is noted that, by reason of the very existence of the buffer chamber 1t, losses remain of a very low order and the auxiliary cooling means have small dimensions. Another point worthy of note is that the safety valve 83 permits preferential expansion of the least hot fraction of the heat-transporting liquid in the event of accidental overpressure. Its operation therefore proves less troublesome and less wasteful of energy than the mean-temperature pressure relief produced by the safety means 43 which are assigned to each cavity and constitute the ultimate emergency system.

Figure 7B:
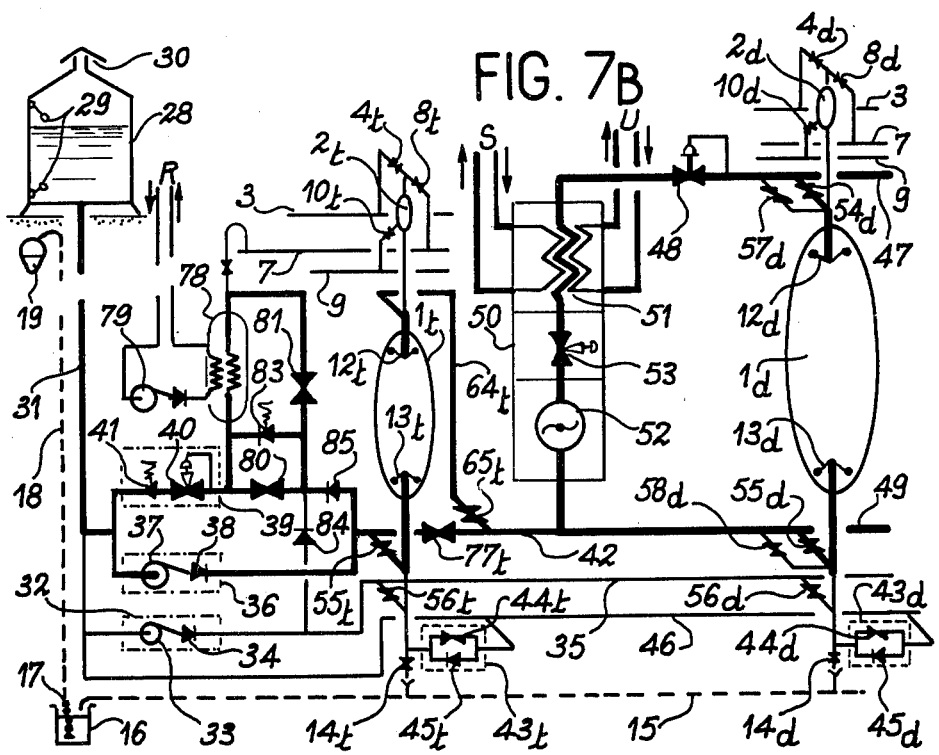

FIG. 7B presents an alternative arrangement in which the aforementioned auxiliary cooling means are placed directly in series with the pressure relief unit on the high-pressure side, thus making it possible to dispense with the pressurization check-valve 82. It is noted that the initial-pressurization relief line which comprises the pressure-regulating valve 62 and the calibrated check-valve in FIG. 7A is dispensed with in FIG. 7B in which the pressure-relief means 39 are constituted solely by the pressure-regulating valve 40 and the calibrated valve 41 of the main pressure-relief line. Pressure relief during initial pressurization can in fact be ensured by said main line by means of two check valves 84 and 85. Thus the check valve 85 makes it possible on the one hand to ensure pressure relief at the time of initial pressurization by means of the control valve 80 or, failing this latter, the check valve 83 and the pressure relief unit 39 without producing any appreciable pressure disturbance within the pressurization-relief line 42. On the other hand, the check valve 84 permits pressurization at the time of recovery or pressure relief during heat storage without producing any appreciable pressure disturbance in the initial-pressurization line 35. This advantageous system can be employed even in the absence of auxiliary cooling means.

Figure 8:
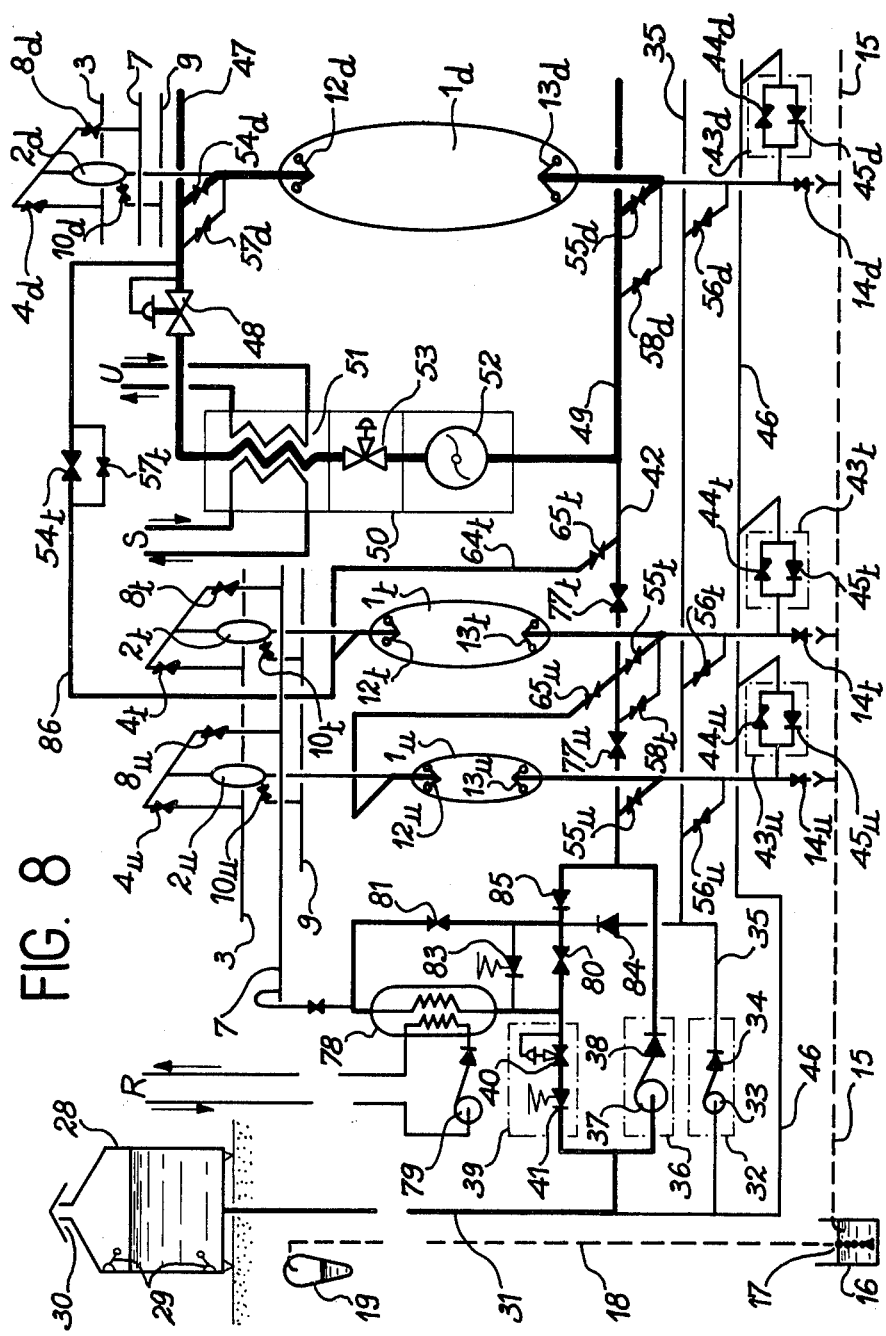
FIG. 8 illustrates the assembly of a triple-expansion system with auxiliary means for cooling the heat-transporting liquid.

As can be seen in FIG. 8, a number of successive buffer chambers of decreasing size can be employed. By way of example, FIG. 8 shows the assembly of two successive chambers 1t and 1u associated with auxiliary cooling means in accordance with the diagram of FIG. 7B. The chamber 1t has a volume as hereinabove defined with reference to FIGS. 6A, 6B, 7A and 7B. The buffer chamber 1u has a volume at least equal to the maximum value of expansion of the heat-transporting liquid contained in the above-mentioned storage chamber (in this case the chamber 1t) when it is brought to the maximum storage temperature. As before, the buffer chamber 1t is provided with all the usual equipment and connected to the pressurization-relief line 42 on the one hand through the control valve 55t, the control valve 65t and the line 64t whilst the control valve 77t effects shoft-circuiting for putting out of service. The arrangement of the buffer chamber 1u is identical with that of the buffer chamber 1t.

Moreover the upper end of the buffer chamber 1t is connected to the top circulation line 47 through a circulation extension line 86 fitted with a top circulation valve 54t. The two valves 54t and 55t are each duplicated by an auxiliary circulation valve 57t and 58t respectively, said auxiliary valve being mounted in parallel with the corresponding main valve. In the case of an assembly provided with more than two buffer chambers, all such chambers would be equipped in the same manner as the buffer chamber 1t except for the last chamber in which the simplified assembly of the buffer chamber 1u is sufficient. This arrangement permits a very substantial reduction in the additional volume of underground cavities made necessary by the installation of a single buffer cavity and therefore proves highly advantageous from an economic standpoint by reason of the high cost of underground cavities. At the time of heat storage within the main cavities, only the first buffer chamber is in service. When heat storage within the main cavities is completed, it then becomes possible to employ this first buffer chamber as an additional storage chamber by suitably connecting this latter to the circulation and heat exchange circuit whereas the second buffer chamber is put into service. If there are more than two successive buffer chambers, the other buffer chambers are employed successively as storage enclosures except for the last chamber and the small volume of this latter is alone added to the storage volume which is really utilizable.

Figure 9:
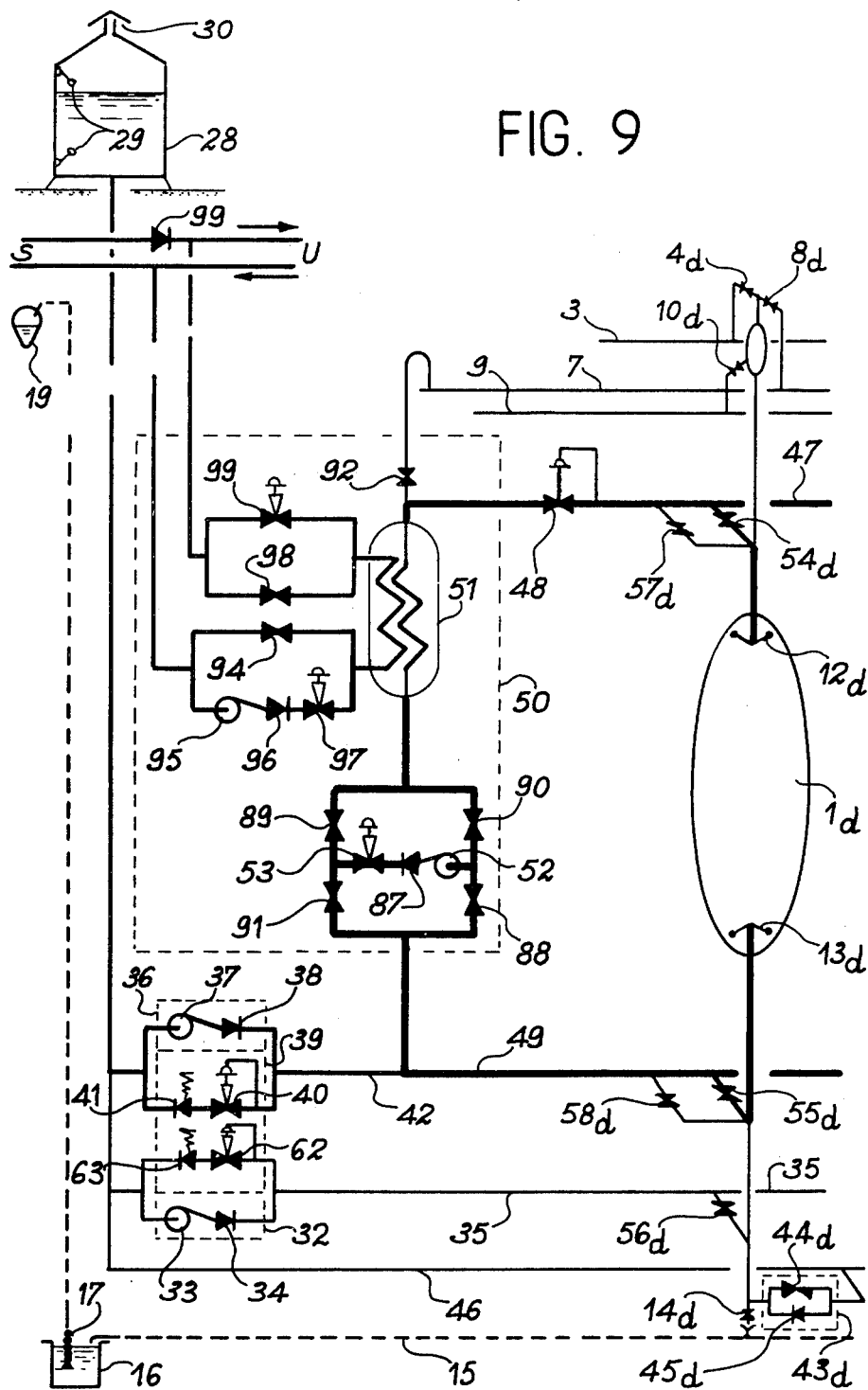
FIG. 9 illustrates the mode of construction of a circulation and heat transfer circuit in which provision is made for a reversible heat exchanger.

FIG. 9 shows a mode of construction of the set of means 50 for heat exchange, circulation and regulation as defined in FIGS. 1 to 4 and shown in all the preceding figures. In the case now under consideration, the source S and the utilization system U call for the same heat-transporting liquid at temperatures which are close in value and one or a number of reversible heat exchangers can be employed for both the outward and return flow paths. In FIG. 9, a single reversible heat exchanger is illustrated. The first circuit of the reversible heat exchanger 51 is connected on the one hand to the top circulation line 47 through the flow-arresting valve 48 and on the other hand to a system of pipe lines conventionally designated as a ring manifold. This term refers to the general shape of the arrangement diagram and does not imply any basic assumptions in the real arrangement of equipment elements.

In accordance with customary practice, the ring manifold comprises four control valves 88, 89, 90 and 91, the common point of the valves 89 and 90 being connected to the bottom circulation line 49 and the pressurization-relief line 42. The common point of the valves 89 and 90 is connected to the suction side of a pump set represented diagrammatically by a circulating pump 52 fitted with its non-return valve 87. The discharge side of the pump is connected to the common point of the control valves 89 and 91 by means of the flow-regulating valve 53. The top portion of the circulation loop is fitted with a blow-down valve 92 for filling this circuit. Thus, transfer in the appropriate direction and heat build-up of the heat-transporting liquid during heat storage are readily permitted by said circulation and heat exchange circuit as a result of the combined opening of the valves 88 and 89 and closure of the valves 90 and 91; said circulation loop permits transfer in the opposite direction and cooling of the heat-transporting liquid during heat recovery as a result of combined opening of the valves 90 and 91 and closure of the valves 88 and 89. Flow regulation is ensured in both directions by the single flow-regulating valve 53 through which the heat-transporting liquid always flows in the same direction, under the same hydrodynamic conditions and at closely related temperatures.

The second circuit of the reversible heat exchanger 51 is connected during heat storage on the one hand to the hot line which connects the source S to the utilization system U through a flow-regulating valve and on the other hand directly to the return line of the external network by means of the storage valve 94 which is open. During the recovery stage, the storage valve 94 is closed and the heat-transporting liquid at the return temperature is over-pressurized by the external circulating pump 95 which is provided on the discharge side with the non-return valve 96 and with a flow-regulating valve 97. After heating within the reversible heat exchanger 51, the heat-transporting liquid is returned directly to the network through the valve 98 which short-circuits the flow-regulating valve 93. In the external network, a non-return valve 99 ensures correct injection of the flow derived from the storage within the external circuit.

It should be noted that the control valve 98 and the flow-regulating valve 97 can be dispensed with; flow regulation of the second circuit of the reversible heat exchanger 51 is accordingly performed in both directions by the single flow-regulating valve 93 which is in that case mounted preferentially in the colder portion of the reversible heat exchanger 51. This simplification of the hydraulic circuit is achieved at the cost of a slight complication of the regulating system. It should further be noted that the system in accordance with the invention behaves in the same manner as any consumption system at the time of heat storage and acts as an additional or single and perfectly variable additional source at the time of heat recovery. This form of construction is therefore very suitable for insertion in a city heating network of the pressurized water type.

There is shown in FIG. 10 another form of construction of the set of means 50 for heat transfer, circulation and regulation. This embodiment corresponds to the case in which provision is made for two non-interconnectable external networks in which one network supplies heat to the system in accordance with the invention from the source S whilst the other network extracts heat from the system in accordance with the invention and transfers the heat to a utilization system U. it matters little whether these separate networks call for different heat-transporting fluids, for a single heat-transporting fluid in different stages or even for the same heat-transporting fluid in the same stage but at different temperatures. The diagram of FIG. 10 can also be utilized when the external heat-transporting fluid is the same in both networks at the same temperature and in the same stage if the fluid is a vapor or a gas which do not permit the use of reversible heat exchangers. It is then necessary to employ different heat exchangers for storage and for recovery. In FIG. 10, there is shown diagrammatically a single heat exchanger 51S for the storage operation. By way of example, this heat exchanger can be a liquid-liquid exchanger, a gas-liquid exchanger or a vapor-liquid exchanger (condenser). It is necessary in the last-mentioned case to provide a pump 100S for extracting condensates. Similarly, there is shown a single heat exchanger 51U which is intended to be employed for the recovery operation and can be a liquid-liquid exchanger, a liquid-gas exchanger or a liquid-vapor exchanger (boiler). Provision must be made in the case last mentioned for a feed pump 100U or for any other feed device such as an injector. A noteworthy feature is the great simplicity of the external circuits of both heat exchangers. The circuits which are connected to the remainder of the system in accordance with the invention (or so-called "internal" circuits) are characterized in that:

(1) the hot ends of the two heat exchangers 51S and 51U are connected to the top circulation line 47 through the flow-arresting valve 48 and comprise a blow-down valve 92 which permits initial filling of the installation;

(2) the cold end of the heat exchanger 51S is connected to the discharge side of the circulating pump set represented diagrammatically by a pump 52 fitted with its non-return valve 87, through a shut-off valve 89 and through the flow-regulating valve 53. The suction side of the pump 52 is connected to the bottom circulation line 49 and the pressurization - pressure relief line 42 through a control valve 88, the operation of which is coordinated with the operation of the control valve 89.

(3) the cold end of the heat exchanger 51U is connected to the suction side of the circulating pump set represented diagrammatically by the aforesaid pump 52 and non-return valve 87 through the shut-off valve 90. The discharge side of the pump 52 is connected to the bottom circulation line 49 and the pressurization - pressure relief line 42 through the flow-regulating valve 53 and a control valve 91, the operation of which is coordinated with the operation of the control valve 90.

It is observed that the ring manifold arrangement of FIG. 9 has been retained except for the fact that the common point of the control valves 89 and 90 is now transferred to the other side of the heat exchangers which are accordingly included in the manifold. In both cases, circulation is carried out in both directions by means of a single pumping unit and by means of the combined action of two pairs of control valves.

There is also shown in FIG. 10 an advantageous auxiliary device which makes it possible to employ the heat exchange means of the system in accordance with the invention for carrying out direct transfer of the heat energy from the source to the utilization system. This device consists of a direct-transfer pumping unit represented diagrammatically by a pump 101 fitted with its non-return valve 102, the suction side of which is connected directly to the cold end of the internal circuit of the heat exchanger 51U and the discharge side of which is connected to the cold end of the internal circuit of the heat exchanger 51S through a flow-regulating valve 103.

It is noted that the embodiment shown in FIG. 10 is particularly well suited to insertion in a pressurized-water city heating network supplied by withdrawals of steam or water at very high temperature from a city heating steam-generating system or for the production of industrial steam for power generation or other applications from the heat extracted from the system in accordance with the invention, irrespective of its origin.

FIG. 11 shows an alternative embodiment of the system which was contemplated in FIG. 10. In accordance with the diagram of FIG. 10, it was seen that the use of the heat exchange means of the system in accordance with the invention for transferring thermal energy from the source to the utilization system required the operation of a direct-transfer pump set which is added to the circulating pump set.

The alternative embodiment of FIG. 11 illustrates a means for employing the same pump set in order to perform these two functions. This makes it possible to save valuable space if these units are installed underground. The direct-transfer unit is dispensed with. The circulating pump set is again represented diagrammatically by the pump 52 fitted with its non-return valve 87. The set is still mounted between four control valves but these valves which were previously designated by the references 88 to 91 are now flow-regulating valves 88R to 91R. Under these conditions, the regulating valve 53 can be dispensed with; thus the stream which flows through the storage system and the direct-transfer stream are both regulated by means of suitable action of the four regulating valves 88R to 91R. The simplification of the hydraulic device thus achieved is readily apparent but is acquired at the cost of a much more difficult regulating operation. The choice between the two solutions therefore remains dependent on particular requirements.

From FIG. 12, it is apparent that a single pumping unit can be employed for both pressurization and circulation. It has already been noted that the system in accordance with the invention derives an advantage from the fact that, in the case of a predetermined heat-transporting liquid and predetermined operating temperatures, the characteristic of the pressurization pumping unit and of the circulation pumping unit are closely related. Under certain particular conditions of utilization, one advantageous alternative form of construction consists in employing a composite pumping unit for effecting the circulation during heat storage and carrying out both circulation and pressurization simultaneously at the time of heat recovery. This result can be obtained by means of the system in accordance with the invention by virtue of a very minor modification of the diagram shown in FIG. 9. The pressurization - pressure relief line 42 of FIG. 9 is replaced by a pressurization line 42P and a pressure relief line 42D. The pump 52 and its non-return valve 87 shown in FIG. 9 are of course dispensed with, the line 42D being now directly connected to the common point of the control valves 88 and 90 whilst the line 42P provides a connection between the discharge side of the pressurization pumping unit 36 (now designated as the composite circulation-pressurization unit) and the common point of the control valves 89 and 91 through the flow-regulating valve 53. It is noted that the entire flow which circulates in either direction is expanded and then repressurized. The result which is accordingly achieved by this particular embodiment of the invention is well suited only to the case of heat-transporting liquid and temperatures such that the vapor pressure of the heat-transporting liquid remains of relatively low value. This accordingly permits an economy of capital investment and a reduction in the underground volume required for the pumping installations when these latter are installed at the bottom.

FIG. 12 corresponds to the case in which the composite circulation-pressurization unit is associated with a group of reversible heat exchangers.

FIG. 13 illustrates a similar assembly in which the same composite circulation-pressurization unit is associated with two heat-exchanger units. Said assembly is obtained by introducing a very minor modification in the diagram of FIG. 11. This is identical with the modification which gives rise to the transition from FIG. 9 to FIG. 12, both in regard to its design concept and in its mode of operation, and accordingly calls for the same observations.

FIGS. 14 to 17 illustrate different embodiments of the invention and especially of the circulation and heat-exchange circuit in the particular case in which the heat-transporting liquid and the operating temperatures are such that the vapor pressure of said heat-transporting liquid is of a high order.

Specific problems which were not solved or particularly inadequately solved in the prior art are accordingly created but can readily be solved by a simple adaptation of the system in accordance with the invention.

In fact, in the case of high-temperature applications such as the production of steam for industrial uses such as electric power generation, a major difficulty arises in regard to the dimension of the heat exchange means. When placed at the surface or close to the surface, they entail the need to produce within the cavity or cavities an over-pressure which corresponds to the height of the heat-transporting liquid column. This makes the system impracticable in the case of hydrostatic containment cavities since this overpressure is added to the head pressure which is essential in order to prevent accidental vaporization and inevitably results in destruction of the system as demonstrated by the well-known "burst barrel" experiment conducted by Pascal. In the case of lithostatic containment cavities in accordance with French patent Application No. 76/36 283 filed on Dec. 2, 1976, a solution can be found to the problem but results in considerable over-expenditure by reason of the increase in depth of the cavity or cavities which this requirement entails. When placed at the bottom, the heat exchange means are subjected to high pressures if the external heat-transporting fluids are liquids. In the case of external fluids in the vapor phase, difficult decompression problems complicate cavity operation unless this latter takes place in a plant which is completely underground, entails high capital cost and the need to carry out prohibitive water transfer operations in order to ensure cooling of condensers if it is necessary to operate a turbine. In the prior art, this problem has not always been overlooked; it was mentioned in particular in French patent No. 73/18 318 cited earlier. Though not claimed, one solution which was proposed consisted in installing heat exchangers at the surface and coupled turbine-pumps placed at the bottom with a view to limiting the water pressure within the cavity. This solution is attended by a large number of disadvantages. These include high capital expenditure, the need to operate one of the turbine-pumps at high temperature, the fact that it is essential to operate at a constant flow rate in order to have well-determined pressure drop and compression values and especially the fact that it is impossible to ensure safety of the installations during pump stoppages whilst the cavity is in the hot state. The mere replacement of these turbine-pumps by pressure reducing devices associated with pumps is a solution which has also been contemplated but entails high energy consumption costs. Above all, this expedient cannot ensure safety during pump stoppages since the smallest leakage of these pressure reducers then subjects the cavity to an unacceptable pressure which would be liable to lead to its destruction.

Two embodiments of the heat transfer system in accordance with the invention make it possible in particular to overcome the deficiencies of the prior art in this field of high pressures:

Thus the first embodiment of the system (shown in FIGS. 14 and 15) entails the use of a double circulation pumping unit whilst the second embodiment (shown in FIGS. 16 and 17) makes use of a double heat exchange level.

The choice between these two embodiments depends on the conditions imposed by the exploitation: a very limited temperature drop but relatively high pumping power consumption in the first embodiment, minimized pumping power consumption but a higher temperature drop in the second embodiment.

Figure 14:
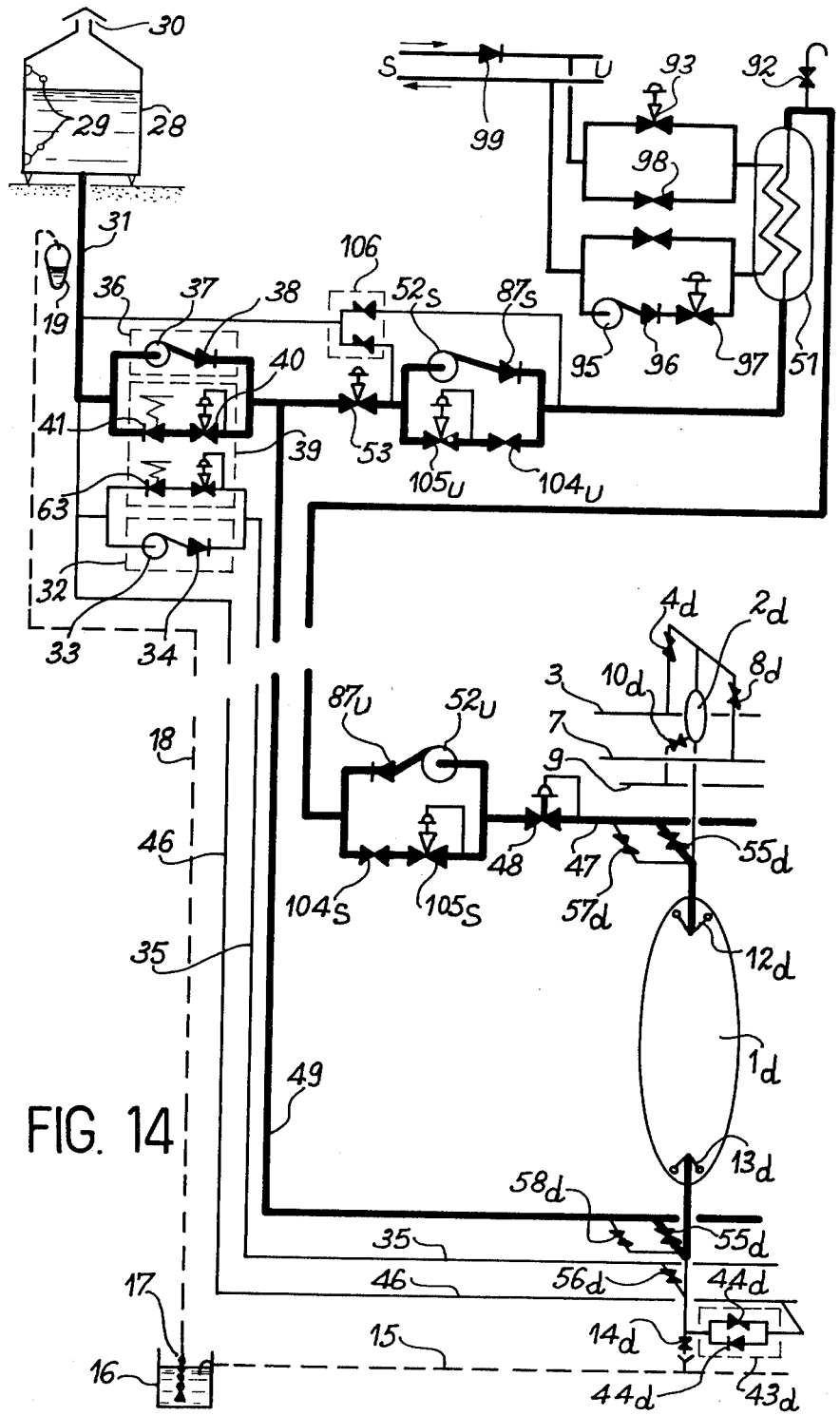

From FIG. 14, it is evident that the pressurization pumping means 36, the pressure relief means 39 and the initial-pressurization means 32 can be placed at the surface. However, an installation located at any level and especially at the bottom can also be contemplated, provided that the appropriate pressure settings are maintained. The heat exchange means comprise at least one reversible heat exchanger 51 and its filling blow-down valve 92 which is placed at the surface and normally connected to the network in accordance with the diagram of FIG. 9.

The pumping unit for effecting the fluid circulation comprises in this example two pumps or sets of pumps:

one set represented diagrammatically by the pump 52U and its non-return valve 87U is placed at the bottom within a suitable cavity or gallery, in the top circulation line 47 (hot portion of the circuit) which is normally provided with its flow-arresting valve 48, said pump or pump set being employed for the heat recovery;

the other set represented diagrammatically by the pump 52S and its non-return valve 87S is placed at the surface or very close to the surface; said set is connected on the suction side to the bottom circulation line 49 through the flow-regulating valve 53 and is employed for heat storage.

Each pump set 52U and 52S is short-circuited by a pipe line fitted with a shut-off valve (104S and 104U respectively) and a pressure-regulating valve (105S and 105U respectively). All the pipe line elements which can be isolated between two valves are connected to the expansion line 31 (or to the safety line 46) through suitable safety valves 106. The pressure-regulating valve 105U is so regulated that, at the time of operation of the pump set 52U, the pressure at the top of the heat exchange means 51 is higher than the vapor pressure of the heat-transporting liquid at the maximum storage temperature. The pressure-regulating valve 105S is so adjusted that, at the time of operation of the pump set 52S, the pressure within the cavity or cavities does not exceed the reference pressure. During heat storage, the shut-off valve 104S is open and the shut-off valve 104U is closed; during heat recovery, the valve 104U is open and the valve 104S is closed. There in fact exists at each moment a pressure which is higher than the vapor pressure at each point of the hot circuit and a pressure which is lower than the safety pressure within the cavity or cavities. Flow regulation in both directions is ensured by the flow-regulating valve 53. It is noted that faulty operation of the pumping unit for effecting the circulation is not liable to cause any major disturbances since a pressure drop within the cavities initiates closure of the flow-arresting valve 48 whilst excess pressure would simply result either in an increase in the flow rate within the pressure relief unit 39 or, if further fault conditions were to appear at the level of the valves 55, 56, 58 or of the pressure relief unit 39 itself, in the operation of the safety valve 44 of the safety unit 43 corresponding to the cavity under consideration: for example, in the event of an irregularity of operation of the pressure regulating valve 105S, defective operation of the valve 55d, 56d or 58d could cause operation of the valve 44d of the safety unit 43d.

FIG. 15 shows the same embodiment of the pumping means for effecting the circulation associated with heat exchange means comprising two heat exchangers, one heat exchanger 51S being employed for heat storage whilst the other exchanger 51U is employed for heat recovery; this assembly is comparable with the arrangement shown diagrammatically in FIG. 10. It is noted that the assembly constituted by the storage pump 52S and its non-return valve 87S and placed at the surface is connected to the heat exchange means 51S whilst the assembly constituted by the shut-off valve 104U and the pressure-regulating valve is connected to the second heat exchange means 51U. As in FIG. 10, there is shown an auxiliary direct-transfer pump set represented diagrammatically by the auxiliary direct-transfer pump 101 fitted with its non-return valve 102 and with a flow-regulating valve 103.

It can be seen from FIG. 16 that, except for the external circuit of the reversible heat exchange means 51, the system in accordance with the invention is constructed in a manner corresponding to the diagram of FIG. 9, the heat exchange means 51 aforesaid being installed at the bottom within a suitable gallery or cavity. A second set of reversible heat exchange means 51h is installed at the surface or close to the surface and connected to the external network in accordance with the diagram of FIG. 9. The heat exchange means 51 and 51h are also connected to each other by means of an independent circuit for producing a circulation of auxiliary heat-transporting liquid in both directions by means of an auxiliary pumping unit located in the least hot portion of the independent circuit and represented diagrammatically by the pump 52h, its non-return valve 87h and a flow-regulating valve 53h. Such auxiliary pumping unit is installed in a ring manifold comprising two pairs of oppositely-acting control valves, namely those designated by the references 88h, 89h and 90h, 91h. The top point of the circuit is provided with a blow-down valve 92h for filling purposes. The top point of the coldest portion of the circuit is connected to a leak-tight chamber 107 which serves as an expansion and pressure-regulating vessel provided with a liquid drain-off valve 108, a filling valve 109 and a pressurization - pressure relief unit. By way of example, said unit can be constituted by a reserve supply 11 of compressed air or gas fitted with suitable control valves and relief valves 110 and an exhaust valve 111. Provision is made for a drain-off valve 112 at the bottom point of the auxiliary circuit. The heat-transporting liquid of the auxiliary circuit can be the main heat-transporting liquid employed in the cavities of the system. An advantageous solution, however, consists in employing a liquid having a low vapor pressure at the maximum storage temperature, there being no economic objection to the use of costly heat-transporting liquid within the small-volume auxiliary circuit. By applying suitable pressure within the leak-tight chamber 107, it is accordingly possible to have small differences in pressure between the two circuits of the heat exchange means 51 and also of the heat exchange means 51h, thereby enhancing safety while reducing investment costs.

The general principle of FIG. 17 is identical with FIG. 16, the sole difference being the mode of heat exchange with the external networks which are independent in this particular example.

The auxiliary pumping unit and the surface or subsurface heat exchange means are now in accordance with the heat exchange and circulation means of FIG. 11 and are constituted by the two exchange means 51S and 51U which may be equipped with the pumps 100S and 100U, the pump set represented diagrammatically by the pump 52h and its non-return valve 87h, the four flow-regulating valves 88rh, 89rh, 90rh, 91rh which serve on the one hand to regulate simultaneously the storage or recovery flow rate and on the other hand to permit a direct-transfer flow from the source to the utilization system via the heat exchange means of the system in accordance with the invention. It is clearly apparent that these auxiliary pumping means could also be constructed in accordance with the diagram of the heat exchange and circulation means shown in FIG. 10.

FIG. 18 shows a form of construction of a pumping station which entails the use of series-parallel connecting grids. The pumping means or pump set described earlier are represented diagrammatically by a single pump associated with its non-return valve. A very economical procedure consists in carrying out optimum adjustment of the pumping means according to the necessary pressures and flow rates at each instant. This can readily be obtained by means of the conventional expedient of series-parallel connecting grids which are particularly well adapted to the construction of all the pump sets of the system in accordance with the invention. When making use of three pumps, for example, the use of grids of the type aforesaid permits twenty-five theoretical combinations. Many of these prove to be of no practical value or else produce identical results. However, by making a judicious choice of the characteristics of the three pumps, eight to ten ranges of flow rates can readily be obtained independently of the possibilities offered by the variation in speed of the pumps, which proves sufficient in the majority of practical applications. By way of example, FIG. 18 shows the means for circulation pumping, initial pressurization, pressurization and direct transfer—as well as the pressure relief means—corresponding to the diagram of FIG. 10. The set of circulating pumps comprises the pumps 52a, 52b and 52c together with their non-return valves (designated respectively by the references 87a, 87b, 87c).

By means of a set of suitable control valves, the discharge of each pump can be fed either into a general delivery-pipe line 113 or into a special delivery-pipe line, namely the line 114a in the case of the pump 52a, the line 114b in the case of the pump 52b, the line 114c in the case of the pump 53c. By means of a set of suitable control valves, the intake of each pump can be supplied either from a general intake-pipe line 115 or from any one of the special delivery-pipe lines of two other pumps. There are again shown in FIG. 18 the two pairs of oppositely-acting valves defined with reference to FIG. 10, namely the valves 88–89 and 90–91. The general delivery line 113 is connected to the common point of the valves 89 and 91 through the flow-regulating valve 53; the general intake line 115 is interposed between the valve 88 and the valve 90. Similarly, the direct-transfer pump set comprises the three pumps 101a, 101b. 101c equipped respectively with their non-return valves 102a, 102b, 102c. The discharge side of said pumps is connected either to the general delivery-pipe line 116 or to one of the special delivery-pipe lines (117a, 117b or 117c respectively). The intake side of said pumps is connected either to the general intake-pipe line 118 or to any one of the special delivery-pipe lines of two other pumps. The general delivery line is connected through the flow-regulating valve 103 to the line which connects the valve 89 to the heat exchange means 51S. The general intake line is the line which connects the valve 90 to the heat exchange means 51U. Finally, the pressurization pumping unit comprises the three pumps 37a, 37b, 37c which are provided respectively with their non-return valves 38a, 38b, 38c. The general delivery pipe is none other than the bottom circulation line 49 which also performs the function of pressurization and relief line. Provision is made in the same manner as before for three special delivery lines 119a, 119b, 119c. The expansion line 31 performs the function of general intake line. There can also be seen in FIG. 18 the initial-pressurization pump 33 which is fitted with its non-return valve 34 and supplies the initial-pressurization line 35. The safety line 46 is directly connected to the expansion line 31.

It should be noted that the pressure relief means comprise a triple line:

the main line normally comprises in accordance with the invention a pressure-regulating valve 40a and a calibrated check valve 41a;

the initial-pressurization relief line comprises a pressure-regulating valve 62 and a calibrated check valve 63 mounted between the expansion line 31 and the initial-pressurization line 35;

the auxiliary line duplicates the main line and is mounted in the same manner as this latter between the expansion line 31 and the bottom circulation line 49. Said auxiliary line comprises the pressure-regulating valve 40b and the calibrated check valve 41b. The auxiliary line permits the passage of a maximum flow which is of higher value than the main line and is regulated for a slightly increased reference pressure. This advantageous arrangement permits of better regulation throughout the entire flow range; the low values of flow pass solely through the main line whilst the high values of flow result in full opening of the main line and in regulation by the auxiliary line. It is clearly possible to make provision for a plurality of auxiliary lines adjusted to suitable pressures.

What we claim is:

1. A heat transfer system for the utilization of cavities dug in the subsoil as heat silos by circulating a heat-transporting liquid on the one hand for the introduction of heat into one or a number of cavities which have been dug in the subsoil and the available internal capacity of which is normally filled with said heat-transporting liquid during the utilization stages and on the other hand for the extraction of heat from said cavity or cavities, wherein said system comprises in combination:

a circulation and heat exchange circuit comprising suitable pumping means, heat exchange means and flow regulation means which make it possible at the time of heat storage to carry out extraction of the heat-transporting liquid at low temperature at the lower end of the cavity or cavities, heating of said liquid by heat exchange with an external fluid and reinjection of said liquid at the upper end of the cavity or cavities and, at the time of heat recovery, to carry out extraction of the heat-transporting liquid at high temperature at the upper end of the cavity or cavities, cooling by heat exchange with an external fluid and reinjection of said liquid at the lower end of the cavity or cavities, said circulation and heat exchange circuit including at least one pipe line leading to the top of the cavity or cavities having at least one flow-arresting valve therein constituted by a normally-closed valve caused to open by the pressure within the cavity or cavities or constituted by any other equivalent device for isolating the top of the cavity or cavities from the remainder of the system if the internal pressure at the top of the cavity or cavities becomes lower than a minimum operating pressure which is in turn slightly higher than the vapor pressure of the heat-transporting liquid at the maximum storage temperature and appreciably lower than the reference pressure aforesaid;

at the top portion of the cavity, a purge device comprising a small auxiliary chamber containing a predetermined quantity of air or of gas;

within the interior of the cavity or each cavity, two equipment units for injection and recovery of the heat-transporting liquid, one unit being located in the top portion of the cavity and the other unit being located in the bottom portion of said cavity;

expansion means comprising at least one expansion reservoir at atmospheric pressure which is put into communication with the base of the cavity or each cavity by means of a system of pipe lines for transferring the heat-transporting liquid having pressurization and pressure relief means;

a safety unit comprising a filling check-valve or any like device for allowing the heat-transporting liquid to pass freely from the expansion means to the cavity or each cavity while completely preventing flow in the opposite direction.

2. A heat transfer system according to claim 1, wherein the cavities are each provided with a leak-tight deformable internal lining which is attached to the walls.

3. A heat transfer system according to claim 1, wherein said system comprises a plurality of cavities and series-connection pipe lines for connecting the base of one cavity to the top of the following cavity in a constant manner or by means of a set of suitable control valves according to the user's requirements, thus permitting utilization of either all or part of the cavities in series.

4. A heat transfer system according to claim 1, wherein said circulation and heat exchange circuit comprises:

a heat storage pump or set of pumps fitted with non-return valves and located at the surface or close to the surface in which the suction side is connected to the base of the cavity or cavities and the discharge side is connected to the least hot portion of the heat exchange means placed at the surface or close to the surface;

a heat recovery pump or set of pumps fitted with non-return valves and located at the bottom within a suitable cavity or gallery in which the suction side is connected to the top of the cavity or cavities through the flow-arresting valve aforesaid and the discharge side is connected to the hottest portion of the same heat exchange means placed at the surface or close to the surface;

a pipe line which makes it possible during heat recovery to short-circuit the heat storage pump or set of pumps and is accordingly fitted with a shut-off valve and a pressure-regulating valve mounted in series therewith and adapted to permit a flow rate which is just sufficient to maintain at the head of the system a pressure of higher value than the vapor pressure of the heat-transporting liquid at the maximum operating temperature, said pipe line being directly connected to the least hot portion of the heat exchange means aforesaid if they are reversible or to other heat exchange means mounted in parallel with the means aforesaid if they are not reversible;

a pipe line which makes it possible during heat storage to short-circuit the heat recovery pump or set of pumps and is accordingly fitted with a shut-off valve and a pressure-regulating valve mounted in series therewith and adapted to permit a flow rate which is just sufficient to maintain within the cavity or cavities a pressure which is substantially equal to said reference pressure;

at least one flow-regulating valve in the least hot portion of said circulation circuit;

outlet valves, calibrated check valves or like devices for discharging to said expansion reservoir at atmospheric pressure the excess heat-transporting liquid resulting from expansions which may arise in particular from overheating by thermal conduction in those portions of pipe lines which may be isolated between two control valves or check valves at any moment of utilization.

5. A heat transfer system according to claim 1, wherein said system is connected to any heat source and restores heat by generation of steam for a wide range of industrial applications and especially for the production of mechanical power.

6. A heat transfer system according to claim 1, wherein said system is connected to any heat source and restores heat by reheating or vaporization of a heat-transporting liquid circulated in a city heating network.

7. A heat transfer system according to claim 1, wherein said system comprises a plurality of cavities which can be utilized as heat silos either separately or in parallel by means of a set of suitable control valves and pipe lines.

8. A heat transfer system according to claim 7, wherein said purge device, said injection-recovery equipment units and said safety unit are provided for each cavity whilst the other means are common to all the cavities and each cavity can be connected through a suitable set of valves, at least:

to purge collection, gas pressurization and dewatering pipe lines;

to a top circulation line comprising a common flow-arresting valve connected to the upper end of the unit constituted by the circulation pumping, heat exchange and flow-regulating means;

to a bottom circulation line connected on the one hand to the lower end of the unit constituted by the circulation pumping, heat exchange and flow-regulating means and on the other hand to said pressurization pumping unit and to said pressure relief unit;

to an initial-pressurization line connected to said initial-pressurization pump and to an auxiliary pressure relief unit or to said pressure relief unit through suitable check valves for ensuring independent operation with respect to the pipe line aforesaid, said safety units being all connected to a safety line which is directly connected to said expansion reservoir at atmospheric pressure.

9. A heat transfer system according to claim 8, wherein said system comprises shut-off valves or suitable locking devices for neutralizing any one of said check valves for filling said safety units, means being provided for making this neutralization impossible at the time of normal utilization of the corresponding cavity and permitting said neutralization only under predetermined circumstances such as periodic inspections or maintenance or repair operations.

10. A heat transfer system according to claim 8 or claim 7, wherein each cavity is connected at the top to said top circulation line and at the bottom to said bottom circulation line respectively through two sets of control valves each comprising a main valve through which the heat-transporting liquid passes at its maximum rate of flow and an auxiliary valve which is mounted in parallel with said main valve and through which the heat-transporting liquid passes at a low rate of flow.

11. A heat transfer system according to claim 1, wherein said injection-recovery equipment units located in the bottom portion of the cavity or each cavity are symmetrical with respect to a horizontal plane with said injection-recovery units located in the top portion of the cavity or each cavity, said injection-recovery units being constituted by a vertical pipe connected at the upper portion thereof to a plurality of small horizontal initialization pipes pierced by slits, holes or fitted with nozzles and so arranged that the pressure drop of the heat-transporting liquid at a low rate of flow is negligible and becomes of very high value at the maximum rate of flow, said vertical pipe being also connected through one or a number of distribution boxes, feed pipes and union elbows to a series of peripheral pipes pierced by slits or orifices or fitted with nozzles, each peripheral pipe being rectilinear and the complete array of pipes being such as to form a closed polygonal line, the feed pipes being disposed radially or in accordance with any other arrangement which permits supply of the peripheral pipes at both ends thereof, the slits, orifices or nozzles of the peripheral pipes being such as to introduce in all only a negligible pressure drop in respect of operation at the maximum rate of flow.

12. A heat transfer system according to claim 11, wherein said horizontal initialization pipes are screened pipes of a standard or reinforced type such as those employed in water-collecting operations or oil-well drilling operations, said screened pipes being fitted if necessary with any auxiliary device such as diaphragms for adjusting the pressure drops to a suitable value as a function of the flow rate.

13. A heat transfer system according to claim 11 or claim 12, wherein said peripheral pipes are screened pipes of a standard or reinforced type such as those employed in water-collecting operations or oil-well drilling operations.

14. A heat transfer system according to claim 11, wherein the pipes of said injection-recovery equipment units and especially the vertical pipes aforesaid comprise one or a number of expansion-compensating devices such as a bellows-type expansion joint or sliding joint.

15. A heat transfer system according to claim 11, wherein said expansion means comprise a buffer chamber constituted by a cavity or a plurality of cavities connected in parallel, in series or in series-parallel, having a volume at least equal to the volume of the expansion reservoir aforesaid at atmospheric pressure, provided with purge devices, injection-recovery equipment and safety units similar to the equivalent installations of the main cavity or cavities and capable by means of a suitable set of control valves of being either put out of circuit or interposed between the base of the cavity or cavities in use and the aforesaid pressurization pumping and pressure relief units.

16. A heat transfer system according to claim 15, wherein said buffer chamber can also be connected to the remainder of the system by means of a set of suitable control valves in the same manner as the main cavity or cavities, provision being made for a second buffer chamber having a smaller volume than the first but at least equal to the volume corresponding to expansion of the heat-transporting liquid contained in the first buffer chamber at the time of heating to the maximum storage temperature whilst said second buffer chamber can also be connected in the same manner as the first buffer chamber if necessary and be followed by a third buffer chamber having a smaller volume, and so on in sequence.

17. A heat transfer system according to claim 1, wherein said expansion means comprise a buffer chamber constituted by a cavity or a plurality of cavities connected in parallel, in series or in series-parallel, having a volume at least equal to the volume of the expansion reservoir aforesaid at atmospheric pressure, provided with purge devices and injection-recovery equipment units similar to the equivalent installations of the main cavity or cavities and being capable by means of a suitable set of control valves of being either put out of circuit or interposed between on the one hand the pressurization pumping and pressure relief units aforesaid and on the other hand said expansion reservoir at atmospheric pressure.

18. A heat transfer system according to any one of claims 15 to 17, wherein said system comprises auxiliary means for cooling the heat-transporting liquid, at least one auxiliary heat exchanger fitted with purge devices for permitting initial filling of said exchanger, one circuit of said auxiliary heat exchanger being coupled to an external cold source by means of suitable pumps for circulating an auxiliary heat-transporting fluid whilst the heat-transporting liquid discharged from the buffer chamber aforesaid during the heat storage stages is permitted to circulate through the second circuit of the heat exchanger by means of the set of suitable control valves.

19. A heat transfer system according to claim 18, wherein said auxiliary cooling means are continuously short-circuited by a pipe line fitted with a check valve which allows the heat-transporting liquid to pass freely in the direction corresponding to pressurization and does not permit any flow in the opposite direction.

20. A heat transfer system according to claim 18, wherein said auxiliary cooling means are mounted as a by-pass off the pipe line which supplies said pressure relief unit and therefore cannot carry a circulation of heat-transporting liquid at the time of pressurization.

21. A heat transfer system according to claim 18, wherein said auxiliary cooling means are continuously short-circuited by a pipe line provided with a calibrated check-valve or any like device so arranged and adjusted as to open when the pressure within the cavity or cavities in use attains a value slightly below said safety pressure.

22. A heat transfer system according to claim 1, wherein the pressurization and pressure relief means comprise at least:
an initial-pressurization pump which is capable of maintaining at the top of the cavity or cavities a reference pressure of substantially higher value than the vapor pressure of the heat-transporting liquid at the maximum storage temperature by injecting heat-transporting liquid supplied from the expansion means;
a pressurization pumping unit for producing a flow of heat-transporting liquid from the expansion means to the cavity or cavities at a rate equal to or slightly higher than the flow rate which is strictly necessary in order to ensure that the pressure at the top of the cavity or cavities in use is maintained at a value equal to the reference pressure aforesaid under all conditions of utilization;
a pressure relief unit comprising at least one pressure-regulating valve or at least one calibrated check valve for ensuring a sufficiently high rate of flow of heat-transporting liquid from the cavity or cavities to the expansion means under all circumstances while maintaining a pressure equal to said reference pressure at the top of the cavity or cavities concerned.

23. A heat transfer system according to claim 1 or claim 22, wherein the safety unit further comprises at least one outlet valve, a calibrated check valve or any like device for putting the cavity or each cavity into communication with the expansion means if the pressure exceeds the safety pressure which is higher than said reference pressure.

24. A heat transfer system according to claim 22, wherein said pressure relief unit comprises a plurality of parallel lines each provided with at least one pressure-regulating valve or at least one calibrated check-valve, the first line being so designed that a small stream is permitted to pass therethrough at a maximum flow rate and being so adjusted as to maintain a pressure in the vicinity of said reference pressure, the second line being so adjusted as to maintain a pressure which is slightly higher than the preceding and to be brought into service when the first line has already been opened to the maximum extent and the pressure tends to continue to rise, and so on in sequence in the case of any other successive lines.

25. A heat transfer system according to claim 22, wherein the aforesaid pressurization pumping unit also constitutes the aforesaid pumping means of the circulating and heat exchange circuit by virtue of its association with a set of two pairs of oppositely acting valves for ensuring:

during heat storage, the connection of the discharge side of said pressurization pumping unit to the top of the cavity or cavities through the aforesaid flow-arresting valve and heat exchange means, the high-pressure side of the aforesaid pressure relief unit being in that case connected to the base of the cavity or cavities;

during heat recovery, the connection of the discharge on the high-pressure side of said pressure relief unit to the top of the cavity through said flow-arresting valve and through the aforesaid heat exchange means if said means are reversible or through other heat exchange means if they are not reversible, the discharge of said pressurization pumping unit being in that case connected to the base of the cavity or cavities.

26. A heat transfer system according to claim 1, wherein said circulation and heat exchange circuit comprises a pump or a set of pumps as well as a set of two pairs of oppositely-acting valves for ensuring:

during heat storage, the connection of the suction side to the base of the cavity or cavities, the discharge being accordingly directed towards heat exchange means;

during heat recovery, the connection of the suction side to the heat exchange means aforesaid if said means are reversible or to different heat exchange means if the means aforesaid are not reversible, in which case the discharge is directed towards the base of the cavity or cavities.

27. A heat transfer system according to claim 26 or claim 25, wherein a flow-regulating valve is placed on the discharge side of the pump or set of pumps constituting the aforesaid pumping means of the circulation and heat exchange circuit in order to ensure general regulation of flow of the heat-transporting liquid both at the time of heat storage and at the time of heat recovery.

28. A heat transfer system according to claim 26, wherein the aforesaid set of two pairs of oppositely-acting valves is constituted by four flow-regulating valves which make it possible by combined operation not only to ensure flow regulation of heat-transporting liquid admitted into and discharged from the cavity or cavities during heat storage as well as heat recovery but also to employ said heat exchange means in order to carry out a direct heat transfer from the source to the utilization system whenever necessary.

29. A heat transfer system according to claim 26, wherein the heat transfer means aforesaid are constituted by one or a number of reversible liquid-liquid heat exchangers installed at the bottom within a suitable cavity or gallery, the external circuit of said exchangers being connected to second heat exchange means installed at the surface or in the vicinity of the surface by means of pipe lines constituting an independent auxiliary circuit comprising suitable purge, expansion and pressurization means and in addition in the least hot portion an auxiliary pumping unit comprising one or a number of pumps fitted with non-return valves, a flow-regulating valve placed on the discharge side of the pump or pumps and a set of two pairs of oppositely-acting valves for ensuring:

during heat storage, the connection of the suction side to the pipe line which is connected to the least hot portion of the reversible heat exchange means installed at the bottom, the discharge being in that case directed towards heat exchange means installed at the surface or in the vicinity of the surface;

during heat recovery, the connection of the suction side to the aforesaid heat exchange means installed at the surface or in the vicinity of the surface if said means are reversible or to other heat exchange means installed at the surface or in the vicinity of the surface if the means aforesaid are not reversible, in which case the discharge is directed towards the pipe line connected to the least hot portion of the reversible heat exchange means installed at the bottom.

30. A heat transfer system according to claim 29, wherein said independent auxiliary circuit makes use of a heat-transporting liquid which is different from the main heat-transporting liquid and has in particular a substantially lower vapor pressure at the maximum operating temperature.

31. A heat transfer system according to claim 29, wherein the aforesaid second heat exchange means installed at the surface or in the vicinity of the surface or the aforesaid heat exchange means are constituted by two heat exchangers or by two sets of separate heat exchangers;

one heat exchanger or set of exchangers being employed at the time of heat storage and so designed as to have a single element or a plurality of elements mounted in parallel, in series or in series-parallel, said elements being liquid-liquid or gas-liquid exchangers or alternatively condensers equipped with one or a number of pumps for recirculation of condensates and having external circuits connected to a heat source and containing an external heat-transporting fluid;

the other heat exchanger or set of exchangers being employed at the time of heat recovery and so designed as to have a single element or a plurality of elements mounted in parallel, in series or in series-parallel, said elements being liquid-liquid, liquid-gas exchangers or alternatively boilers equipped with one or a plurality of feed pumps and having external circuits connected to a heat utilization system and containing an external heat-transporting fluid.

32. A heat transfer system according to claim 31, wherein one or a number of pumps fitted with non-return valves are disposed in such a manner as to ensure that the suction side is connected to the coldest portion of the internal circuit of the heat exchanger or set of exchangers employed at the time of heat recovery and that the discharge side is connected through a flow-regulating valve to the coldest portion of the internal circuit of the heat exchanger or set of exchangers employed at the time of heat storage, this arrangement being such as to permit the use of said heat exchange means in order to carry out direct heat transfer from the source to the utilization system whenever necessary.

33. A heat transfer system according to claim 29, wherein the aforesaid second heat exchange means installed at the surface or in the vicinity of the surface or the aforesaid heat exchange means are constituted by a single element or a plurality of elements mounted in parallel, in series or in series-parallel, said elements being reversible liquid-liquid exchangers having an external branch circuit mounted as a by-pass off a heat-transporting network for connecting a heat source to a utilization system by circulating an external heat-transporting liquid.

34. A heat transfer system according to claim 33, wherein the branch circuit of said system which is mounted as a by-pass off said heat-transporting network comprises at least:

one non-return valve placed in the hot line of said heat-transporting network upstream of the by-pass;

one hot branch line for connecting the hot line of said heat-transporting network to the hottest portion of the external circuit of said reversible liquid-liquid heat exchanger or exchangers;

one branch line at the return temperature which serves to connect the return line of said heat-transporting network to the suction side of a pumping unit provided with at least one non-return valve, the discharge side of said unit being connected to the coldest portion of the external circuit of said reversible liquid-liquid heat exchanger or exchangers and being adapted to operate during heat recovery;

one pipe line fitted with a shut-off valve for short-circuiting the pumping unit aforesaid during heat storage;

at least one flow-regulating valve at any point of the branch circuit.

35. A heat transfer system according to claim 34, wherein the aforesaid flow-regulating valve installed in the branch circuit is located in said hot branch line, serves to regulate the flow during heat storage and is maintained open or short-circuited by means of a pipe line fitted with a shut-off valve which is open during heat recovery, a second flow-regulating valve being placed on the discharge side of the pumping unit and accordingly adapted to ensure flow regulation during heat recovery and short-circuited during heat storage.

* * * * *